US007753779B2

(12) United States Patent
Shayesteh

(10) Patent No.: US 7,753,779 B2
(45) Date of Patent: Jul. 13, 2010

(54) GAMING CHIP COMMUNICATION SYSTEM AND METHOD

(75) Inventor: Hamid Shayesteh, Woodinville, WA (US)

(73) Assignee: Bally Gaming, Inc., Las Vegas, NV (US)

( * ) Notice: Subject to any disclaimer, the term of this patent is extended or adjusted under 35 U.S.C. 154(b) by 985 days.

(21) Appl. No.: 11/479,988

(22) Filed: Jun. 30, 2006

(65) Prior Publication Data

US 2007/0293303 A1 Dec. 20, 2007

Related U.S. Application Data

(60) Provisional application No. 60/814,664, filed on Jun. 16, 2006.

(51) Int. Cl.
*A63F 9/24* (2006.01)
*H04B 5/00* (2006.01)
*G06K 19/14* (2006.01)

(52) U.S. Cl. .............................. 463/25; 463/39; 463/43; 340/572.1; 340/572.7

(58) Field of Classification Search .................. 463/25; 340/572.1, 572.7; 235/380
See application file for complete search history.

(56) References Cited

U.S. PATENT DOCUMENTS

| | | | | |
|---|---|---|---|---|
| 3,740,742 | A | 6/1973 | Thompson et al. | 340/280 |
| 3,766,452 | A | 10/1973 | Burpee et al. | 317/262 R |
| 3,810,172 | A | 5/1974 | Burpee et al. | 343/5 PD |
| 4,023,167 | A | 5/1977 | Wahlstrom | 343/6.5 SS |
| 4,026,309 | A | 5/1977 | Howard | 133/8 R |
| 4,031,376 | A | 6/1977 | Corkin, Jr. | 235/156 |
| 4,510,490 | A | 4/1985 | Anderson, III et al. | 340/572 |
| 4,531,117 | A | 7/1985 | Nourse et al. | 340/572 |
| 4,531,187 | A | 7/1985 | Uhland | 364/412 |
| 4,656,463 | A | 4/1987 | Anders et al. | 340/572 |
| 4,660,025 | A | 4/1987 | Humphrey | 340/572 |
| 4,746,830 | A | 5/1988 | Holland | 310/313 D |
| 4,755,941 | A | 7/1988 | Bacchi | 364/412 |
| 4,814,589 | A | 3/1989 | Storch et al. | 235/375 |

(Continued)

FOREIGN PATENT DOCUMENTS

DE 44 39 502 C1 9/1995

(Continued)

OTHER PUBLICATIONS

English Translation of German Patent No. DE 197 48 930, publication date of May 14, 1998, inventor: Markeev.

(Continued)

*Primary Examiner*—John M Hotaling
*Assistant Examiner*—Steve Rowland
(74) *Attorney, Agent, or Firm*—Seed IP Law Group PLLC

(57) ABSTRACT

A system and method for a gaming chip communication includes a memory configured to store chip information, a first antenna communicatively coupled to the memory and configured to receive a first radio frequency (RF) signal that includes at least previous stack information, a second antenna operable to communicate a second RF signal that comprises the previous stack information and the chip information, and where the first antenna is further configured to communicate an RF acknowledgement signal to a communication system that transmitted the first RF signal in response to the second antenna communicating the second RF signal.

57 Claims, 12 Drawing Sheets

U.S. PATENT DOCUMENTS 4,859,991 A 8/1989 Watkins et al. .............. 340/572
4,861,041 A 8/1989 Jones et al. ................. 273/292
4,870,391 A 9/1989 Cooper ....................... 340/572
4,920,335 A 4/1990 Andrews .................... 340/572
4,926,996 A 5/1990 Eglise et al. ................ 194/212
5,007,641 A 4/1991 Seidman ................. 273/138 A
5,103,234 A 4/1992 Watkins et al. .............. 343/742
5,166,502 A 11/1992 Rendleman et al. ......... 235/492
5,179,517 A 1/1993 Sarbin et al. ................ 364/410
5,258,837 A 11/1993 Gormley ..................... 358/140
5,283,422 A 2/1994 Storch et al. ................ 235/375
5,361,885 A 11/1994 Modler ....................... 194/214
5,364,104 A 11/1994 Jones et al. ................ 273/292
5,397,133 A 3/1995 Penzias ...................... 273/439
5,406,264 A 4/1995 Plonsky et al. .............. 340/572
5,466,010 A 11/1995 Spooner ...................... 283/67
5,470,079 A 11/1995 LeStrange et al. ....... 273/138 A
5,505,461 A 4/1996 Bell et al. ................... 273/433
5,538,803 A 7/1996 Gambino et al. ...... 428/694 TM
5,557,280 A 9/1996 Marsh et al. .................. 342/44
5,564,700 A 10/1996 Celona ........................ 463/27
5,581,257 A 12/1996 Greene et al. ................ 342/51
5,586,936 A 12/1996 Bennett et al. ................ 463/25
5,605,334 A 2/1997 McCrea, Jr. ................. 273/309
5,613,912 A 3/1997 Slater .......................... 463/25
5,625,341 A 4/1997 Giles et al. .................. 340/572
5,651,548 A 7/1997 French et al. ............... 273/309
5,655,961 A 8/1997 Acres et al. ................... 463/27
5,676,376 A 10/1997 Valley ........................ 273/288
5,698,839 A 12/1997 Jagielinski et al. .......... 235/493
5,699,066 A 12/1997 Marsh et al. .................. 342/44
5,707,287 A 1/1998 McCrea, Jr. .................. 463/27
5,735,525 A 4/1998 McCrea, Jr. ................. 273/309
5,735,742 A 4/1998 French ........................ 463/25
5,742,656 A 4/1998 Mikulak et al. ................ 377/7
5,754,110 A 5/1998 Appalucci et al. ........... 340/572
5,755,618 A 5/1998 Mothwurf .................... 453/17
5,757,876 A 5/1998 Dam et al. ..................... 377/7
5,759,103 A 6/1998 Freels et al. .................. 463/42
5,766,075 A 6/1998 Cook et al. ................... 463/25
5,770,533 A 6/1998 Franchi ....................... 463/42
5,785,321 A 7/1998 van Putten et al. .......... 273/309
5,801,766 A 9/1998 Alden ........................ 348/157
5,803,808 A 9/1998 Strisower ..................... 463/11
5,809,482 A 9/1998 Strisower ..................... 705/30
5,812,065 A 9/1998 Schrott et al. .......... 340/825.54
5,813,912 A 9/1998 Shultz ......................... 463/25
5,823,879 A 10/1998 Goldberg et al. .............. 463/42
5,831,532 A 11/1998 Gambino et al. ............ 340/572
5,831,669 A 11/1998 Adrain ....................... 348/143
5,842,921 A 12/1998 Mindes et al. ................ 463/16
5,847,650 A 12/1998 Zhou et al. .................. 340/572
5,895,321 A 4/1999 Gassies et al. ................ 463/29
5,909,876 A 6/1999 Brown ........................ 273/309
5,911,626 A 6/1999 McCrea, Jr. .................. 463/27
5,919,090 A 7/1999 Mothwurf .................... 463/25
5,936,527 A * 8/1999 Isaacman et al. ......... 340/572.1
5,941,769 A 8/1999 Order .......................... 463/12
5,957,776 A 9/1999 Hoehne ....................... 463/25
6,001,016 A 12/1999 Walker et al. ................. 463/42
6,003,013 A 12/1999 Boushy et al. ................ 705/10
6,010,404 A 1/2000 Walker et al. ................. 463/21
6,021,949 A 2/2000 Boiron ....................... 235/492
6,029,891 A 2/2000 Freeman et al. ............. 235/380
6,039,650 A 3/2000 Hill ............................ 463/47
6,093,103 A 7/2000 McCrea, Jr. .................. 463/27
6,106,395 A 8/2000 Begis .......................... 463/23
6,110,041 A 8/2000 Walker et al. ................. 463/20
6,113,493 A 9/2000 Walker et al. ................. 463/25
6,117,012 A 9/2000 McCrea, Jr. .................. 463/27
6,126,166 A 10/2000 Lorson et al. ........... 273/148 R
6,142,876 A 11/2000 Cumbers ..................... 463/25
6,144,300 A 11/2000 Dames .................... 340/572.2
6,154,131 A 11/2000 Jones, II et al. ............. 340/540
6,165,069 A 12/2000 Sines et al. ................... 463/12
6,165,071 A 12/2000 Weiss .......................... 463/24
6,183,362 B1 2/2001 Boushy ....................... 463/25
6,183,366 B1 2/2001 Goldberg et al. .............. 463/42
6,186,895 B1 2/2001 Oliver ......................... 463/25
6,217,447 B1 4/2001 Lofink et al. .................. 463/12
6,220,960 B1 4/2001 Kryzhanovsky ............. 463/13
6,234,898 B1 5/2001 Belamant et al. .............. 463/25
6,244,958 B1 6/2001 Acres .......................... 463/26
6,254,484 B1 7/2001 McCrea, Jr. .................. 463/27
6,264,109 B1 7/2001 Chapet et al. ............... 235/492
6,267,671 B1 7/2001 Hogan ......................... 463/25
6,283,856 B1 9/2001 Mothwurf .................... 463/17
6,287,202 B1 9/2001 Pascal et al. .................. 463/42
6,299,534 B1 10/2001 Breeding et al. .............. 463/25
6,299,536 B1 10/2001 Hill ............................ 463/47
6,307,473 B1 10/2001 Zampini et al. .......... 340/572.1
6,313,871 B1 11/2001 Schubert ..................... 348/143
6,346,044 B1 2/2002 McCrea, Jr. .................. 463/27
6,350,199 B1 2/2002 Williams et al. .............. 463/16
6,409,595 B1 6/2002 Uihlein et al. ................ 463/29
6,425,817 B1 7/2002 Momemy .................... 453/17
6,437,692 B1 8/2002 Petite et al. ................. 340/540
6,446,864 B1 9/2002 Kim et al. ................... 235/382
6,460,848 B1 10/2002 Soltys et al. ............ 273/149 R
6,464,584 B2 10/2002 Oliver ......................... 463/25
6,486,655 B1 11/2002 Crossfield ............. 324/207.17
6,503,147 B1 1/2003 Stockdale et al. ............. 463/29
6,508,709 B1 1/2003 Karmarkar ................... 463/42
6,508,710 B1 1/2003 Paravia et al. ................ 463/42
6,514,140 B1 2/2003 Storch ........................ 463/25
6,517,435 B2 2/2003 Soltys et al. .................. 463/25
6,517,436 B2 2/2003 Soltys et al. .................. 463/29
6,517,437 B1 2/2003 Wells et al. ................... 463/30
6,520,857 B2 2/2003 Soltys et al. .................. 463/29
6,527,271 B2 3/2003 Soltys et al. ............ 273/148 R
6,530,836 B2 3/2003 Soltys et al. .................. 463/29
6,530,837 B2 3/2003 Soltys et al. .................. 463/29
6,533,276 B2 3/2003 Soltys et al. ............ 273/148 R
6,533,662 B2 3/2003 Soltys et al. .................. 463/25
6,567,159 B1 5/2003 Corech ........................ 356/71
6,575,829 B2 6/2003 Coleman et al. .............. 463/20
6,575,834 B1 6/2003 Lindo .......................... 463/40
6,579,180 B2 6/2003 Soltys et al. .................. 463/25
6,579,181 B2 6/2003 Soltys et al. .................. 463/25
6,581,747 B1 6/2003 Charlier et al. ............. 194/214
6,595,857 B2 7/2003 Soltys et al. .................. 463/29
6,607,441 B1 8/2003 Acres .......................... 463/25
6,620,046 B2 9/2003 Rowe .......................... 463/25
6,629,591 B1 10/2003 Griswold et al. ............ 194/205
6,629,889 B2 10/2003 Mothwurf .................... 463/25
6,638,161 B2 10/2003 Soltys et al. .................. 463/12
6,641,484 B2 11/2003 Oles et al. ..................... 463/47
6,645,077 B2 11/2003 Rowe .......................... 463/42
6,645,078 B1 11/2003 Mattice ....................... 463/42
6,659,875 B2 12/2003 Purton ........................ 463/47
6,663,490 B2 12/2003 Soltys et al. .................. 463/25
6,672,589 B1 1/2004 Lemke et al. ............... 273/236
6,682,423 B2 1/2004 Brosnan et al. ............... 463/29
6,685,564 B2 2/2004 Oliver ......................... 463/25
6,688,979 B2 2/2004 Soltys et al. .................. 463/25
6,702,672 B1 3/2004 Angell et al. ................. 463/25
6,712,696 B2 3/2004 Soltys et al. .................. 463/25
6,712,698 B2 3/2004 Paulsen et al. ................ 463/30
6,722,985 B2 4/2004 Criss-Puszkiewicz et al. . 463/29
6,726,099 B2 * 4/2004 Becker et al. ............... 235/380
6,728,740 B2 4/2004 Kelly et al. ................. 708/250
6,729,956 B2 5/2004 Wolf et al. .................... 463/25
6,735,183 B2 5/2004 O'Toole et al. ............. 370/311
6,739,973 B1 5/2004 Lucchesi et al. .............. 463/35

| | | | | |
|---|---|---|---|---|
| 6,755,741 | B1 | 6/2004 | Rafaeli | 463/25 |
| 6,758,751 | B2 | 7/2004 | Soltys et al. | 463/29 |
| 6,811,488 | B2 | 11/2004 | Paravia et al. | 463/42 |
| 6,812,824 | B1 | 11/2004 | Goldinger et al. | 340/10.1 |
| 6,817,948 | B2 | 11/2004 | Pascal et al. | 463/42 |
| 6,846,238 | B2 | 1/2005 | Wells | 463/39 |
| 6,848,994 | B1 | 2/2005 | Knust et al. | 463/25 |
| 6,896,618 | B2 | 5/2005 | Benoy et al. | 463/25 |
| 6,925,701 | B2 | 8/2005 | Eckstein et al. | 29/602.1 |
| 6,947,513 | B2 | 9/2005 | O'Toole et al. | 375/374 |
| 6,969,319 | B2 | 11/2005 | Rowe et al. | 463/25 |
| 6,970,141 | B2 | 11/2005 | Copeland et al. | 343/866 |
| 6,991,544 | B2 | 1/2006 | Soltys et al. | 463/42 |
| 7,005,985 | B1 * | 2/2006 | Steeves | 340/572.1 |
| 7,009,496 | B2 | 3/2006 | Arneson et al. | 340/10.2 |
| 7,028,910 | B2 | 4/2006 | Reignoux et al. | 235/492 |
| 7,029,009 | B2 | 4/2006 | Grauzer et al. | 273/149 P |
| 7,040,139 | B2 | 5/2006 | Sunshine | 73/23.2 |
| 7,271,727 | B2 * | 9/2007 | Steeves | 340/572.7 |
| 2001/0016515 | A1 * | 8/2001 | Oliver | 463/25 |
| 2002/0084587 | A1 | 7/2002 | Bennett et al. | 273/309 |
| 2002/0111210 | A1 | 8/2002 | Luciano, Jr. et al. | 463/29 |
| 2002/0123376 | A1 | 9/2002 | Walker et al. | 463/11 |
| 2002/0142825 | A1 | 10/2002 | Lark et al. | 463/16 |
| 2002/0142846 | A1 | 10/2002 | Paulsen | 463/43 |
| 2002/0147042 | A1 | 10/2002 | Vuong et al. | 463/40 |
| 2002/0187821 | A1 | 12/2002 | Soltys et al. | 463/11 |
| 2003/0022714 | A1 * | 1/2003 | Oliver | 463/25 |
| 2003/0028480 | A1 | 2/2003 | Rowe | 705/39 |
| 2003/0032474 | A1 | 2/2003 | Kaminkow | 463/25 |
| 2003/0036425 | A1 | 2/2003 | Kaminkow et al. | 463/25 |
| 2003/0054881 | A1 | 3/2003 | Hedrick et al. | 463/29 |
| 2003/0064774 | A1 | 4/2003 | Fujimoto et al. | 463/16 |
| 2003/0064798 | A1 | 4/2003 | Grauzer et al. | 463/29 |
| 2003/0073479 | A1 | 4/2003 | Wilson et al. | 463/16 |
| 2003/0083126 | A1 | 5/2003 | Paulsen | 463/25 |
| 2003/0137968 | A1 * | 7/2003 | Lareau et al. | 370/349 |
| 2003/0176218 | A1 | 9/2003 | LeMay et al. | 463/25 |
| 2003/0195037 | A1 | 10/2003 | Vuong et al. | 463/29 |
| 2003/0199320 | A1 | 10/2003 | Nguyen et al. | 463/42 |
| 2003/0212597 | A1 | 11/2003 | Ollins | 705/14 |
| 2003/0220136 | A1 | 11/2003 | Soltys et al. | 463/25 |
| 2003/0232647 | A1 | 12/2003 | Moser | 463/29 |
| 2004/0005920 | A1 | 1/2004 | Soltys et al. | 463/25 |
| 2004/0043820 | A1 | 3/2004 | Schlottmann | 463/43 |
| 2004/0087375 | A1 * | 5/2004 | Gelinotte | 463/47 |
| 2004/0111338 | A1 | 6/2004 | Bandy et al. | 705/28 |
| 2004/0127277 | A1 | 7/2004 | Walker et al. | 463/16 |
| 2004/0207156 | A1 | 10/2004 | Soltys et al. | 273/292 |
| 2004/0219982 | A1 | 11/2004 | Khoo et al. | 463/42 |
| 2004/0229682 | A1 | 11/2004 | Gelinotte | 463/25 |
| 2005/0026680 | A1 | 2/2005 | Gururajan | 463/25 |
| 2005/0027604 | A1 | 2/2005 | Bandy et al. | 705/22 |
| 2005/0051955 | A1 | 3/2005 | Schubert et al. | 273/149 R |
| 2005/0051965 | A1 | 3/2005 | Gururajan | 273/292 |
| 2005/0054408 | A1 | 3/2005 | Steil et al. | 463/11 |
| 2005/0062226 | A1 | 3/2005 | Schubert et al. | 273/149 R |
| 2005/0073102 | A1 | 4/2005 | Yoseloff et al. | 273/292 |
| 2005/0101367 | A1 | 5/2005 | Soltys et al. | 463/12 |
| 2005/0116020 | A1 | 6/2005 | Smolucha et al. | 235/375 |
| 2005/0121852 | A1 | 6/2005 | Soltys et al. | 273/149 P |
| 2005/0156318 | A1 | 7/2005 | Douglas | 257/761 |
| 2005/0164761 | A1 | 7/2005 | Tain | 463/13 |
| 2005/0183264 | A1 | 8/2005 | Eckstein et al. | 29/834 |
| 2005/0200483 | A1 | 9/2005 | Eckstein et al. | 340/572.2 |
| 2005/0227760 | A1 | 10/2005 | Vlazny et al. | 463/28 |
| 2005/0258597 | A1 | 11/2005 | Soltys et al. | 273/274 |
| 2005/0266919 | A1 | 12/2005 | Rowe et al. | 463/25 |
| 2005/0288083 | A1 | 12/2005 | Downs, III | 463/11 |
| 2005/0288084 | A1 | 12/2005 | Schubert | 463/11 |
| 2005/0288085 | A1 | 12/2005 | Schubert et al. | 463/11 |
| 2006/0019745 | A1 | 1/2006 | Benbrahim | 463/29 |
| 2006/0066444 | A1 * | 3/2006 | Steeves | 340/10.5 |
| 2007/0057469 | A1 * | 3/2007 | Grauzer et al. | 273/309 |

FOREIGN PATENT DOCUMENTS

| | | | |
|---|---|---|---|
| DE | 197 48 930 | A1 | 5/1998 |
| DE | 199 40 954 | A1 | 3/2001 |
| EP | 0 327 069 | A2 | 8/1989 |
| EP | 0 790 848 | | 8/1997 |
| FR | 2 775 196 | | 8/1999 |
| GB | 2 382 034 | A | 5/2003 |
| WO | WO 96/03188 | | 2/1996 |
| WO | WO 96/36253 | | 11/1996 |
| WO | WO 99/43403 | | 9/1999 |
| WO | WO 00/22585 | | 4/2000 |
| WO | WO 02/05914 | A1 | 1/2002 |
| WO | WO 03/060846 | A2 | 7/2003 |

OTHER PUBLICATIONS

U.S. Appl. No. 60/887,092, filed Jan. 29, 2007, Shayesteh.
U.S. Appl. No. 11/030,609, filed Jan. 5, 2005, Soltys et al.
U.S. Appl. No. 11/337,375, filed Jan. 23, 2006, Soltys et al.
U.S. Appl. No. 11/408,862, filed Apr. 21, 2006, Soltys et al.
U.S. Appl. No. 11/437,590, filed May 19, 2006, Soltys et al.
U.S. Appl. No. 11/480,274, filed Jun. 30, 2006, Huizinga.
U.S. Appl. No. 11/519,244, filed Sep. 11, 2006, Soltys et al.
U.S. Appl. No. 60/554,090, filed Mar. 17, 2004, Soltys et al.
U.S. Appl. No. 60/838,280, filed Aug. 17, 2006, Soltys et al.
U.S. Appl. No. 60/847,331, filed Sep. 26, 2006, Shayesteh.
Bulavsky, J., "Tracking the Tables," *Casino Journal*, May 2004, pp. 44-47, accessed Dec. 21, 2005, URL=http://www.ascendgaming.com/cj/vendors_manufacturers_table/Trackin916200411141AM.htm, 5 pages.
Burke, A., "Tracking the Tables," reprinted from *International Gaming & Wagering Business*, Aug. 2003, 4 pages.
Gros, R., "All You Ever Wanted to Know About Table Games," reprinted from *Global Gaming Business*, Aug. 1, 2003, 2 pages.
Pro, L.V., "Book Review—The Card Counter's Guide to Casino Surveillance," *Blackjack Insider Newsletter*, May 2003, #40, accessed Aug. 25, 2006, URL=http:/bjinsider.com/newsletter_40_surveillance.shtml, 5 pages.
Snyder, A., "The High-Tech Eye," excerpt from *Blackjack Forum*, Spring 1997, accessed Dec. 21, 2005, from Casino Software & Services, LLC, URL=http://www.casinosoftware.com/bj_forum.html.
Terdiman, D., "Who's Holding the Aces Now?", reprinted from *Wired News*, Aug. 18, 2003, 2 pages.
Ward, K., "BJ Tracking System has Players Down for the Count," *Gaming Today*, Mar. 5, 2002, accessed Dec. 21, 2005, from Casino Software & Services, LLC, URL=http://www.casinosoftware.com/gaming_today.html.
Winkler, C., "Product Spotlight: MindPlay," reprinted from *Gaming and Leisure Technology*, Fall 2003, 2 pages.
Bally TMS, "MP21—Automated Table Tracking/Features," 2 pages, Nov. 2005.
Bally TMS, "MPLite—Table Management System/Features," 2 pages, Nov. 2005.
Bravo Gaming Systems, "Casino Table Wager Analysis and Player Tracking System—Table Operations/Unique Features," accessed Apr. 11, 2005, URL=http://www.genesisgaming.com, 4 pages.
Casino Software & Services, LLC., accessed Aug. 25, 2006, URL=http:/casinosoftware.com/home.html, 6 pages.
*Gambling Magazine*, "Gaming Company Takes RFID to the Casino," Dec. 27, 2004, accessed Aug. 25, 2006, URL=http:/www.gamblingmagazine.com/managearticle.asp?C=290&A=13186, 4 pages.
Hewlett Packard Handhelds, accessed Sep. 8, 2003, URL=http:/www.shopping.hp.com/cgi-bin/hpdirect/shopping/scripts/home/store_access.jsp?temp . . . , 2 pages.
International Guild of Hospitality & Restaurant Managers, "Shuffle Master, Inc. (NasdaqNM:SHFL)," accessed Dec. 30, 2003, URL=http://hospitalityguide.com/Financial/Casinos/Shuffle.htm, 3 pages.

Linksys WAP11 "Wireless Network Access Point," accessed Sep. 8, 2003, URL=http:/www.linksys.com/products/product.asp?prid=157 &grid=, 4 pages.

MagTeck, "Port Powered Swipe Reader," Technical Reference Manual, Manual Part No. 99875094 Rev 12, Jun. 2003, 20 pages.

Mikohn, "Mikohn Tablelink—The Industry's Premier Table Tracking Solution Delivers Improvements Straight to the Bottom Line," 2 pages, before Jan. 1, 2004.

Mikohn, "Tablelink™, The New Standard in Table Games," before Jan. 1, 2004, 14 pages.

Semtek PDA & Handheld Devices, Compaq iSwipe™ Magnetic Card Reader, accessed Sep. 8, 2003, URL=http:/www.semtek.com/products/iswipe.html, 3 pages.

Shuffle Master, Inc., "Shuffle Master Announces New Products; Intelligent Table System to Be Debuted at G2E," Sep. 10, 2003, 2 pages.

Shuffle Master, Inc., "Shuffle Master Gaming Presents The Ultimate Player Rating System . . . Bloodhound Sniffs Out the Pros and Cons," Dec. 31, 1997, 6 pages.

US 6,599,191, 07/2003, Breeding et al. (withdrawn)

* cited by examiner

GAMING CHIP COMMUNICATION SYSTEM AND METHOD

CROSS-REFERENCE TO RELATED APPLICATION

This application claims the benefit under 35 U.S.C. §119 (e) of U.S. Provisional Patent Application Ser. No. 60/814,664 filed Jun. 16, 2006.

BACKGROUND OF THE INVENTION

1. Field of the Invention

This description generally relates to the field of table gaming and, more particularly, to a system and method for communication with gaming chips.

2. Description of the Related Art

Gaming chips, or tokens, are used at various types of gaming tables as a substitute for currency. Identification of individual gaming chips is becoming important to gaming establishments, such as casinos, for a variety of reasons. For example, remote sensing systems, which identify the presence and/or characteristics of valid gaming chips, make it more difficult for individuals to use counterfeit gaming chips or gaming chips from other gaming establishments. Such systems may facilitate interaction of various casino functions, for example, accounting, tracking employee efficiency and/or awarding complimentary benefits ("comps") to customers. Further, such systems may deter cheating at the gaming tables if bets during the game are monitored.

A recent development in the gaming industry is the tracking of individual player gaming activities by identifying and remotely monitoring movement of gaming chips. Tracking an individual player's gaming history by identifying and monitoring gaming chips allows the gaming establishment to identify and/or reward favored customers. Particularly lucky players and/or cheaters may be identified using such monitoring systems.

An exemplary system which allows remote identification of gaming chips is disclosed in French et al., U.S. Pat. No. 5,651,548, which discloses electronically-identifiable gaming chips which have been tagged with a radio frequency transmitter that transmits various information about the gaming chip, such as an individual identification number and/or the value of the chip. The gaming chip employs an electronic transmitter chip, an antenna, and an optional battery. In response to receiving an interrogation signal from a transmitter, the gaming chip communicates a radio signal to a receiving antenna. This system and method of identifying gaming chips is an application of the well known and commonly available radio frequency identification (RFID) technologies. However, the power required to transmit RFID signals from such gaming chips may be an issue because of the relatively large communication distances involved. Also, anti-collision techniques are required to prevent signal collision from two or more gaming chips simultaneously attempting to communicate with RF signals.

Accordingly, it is desirable to be able to facilitate communication with gaming chips using less power and without signal collision.

SUMMARY OF THE INVENTION

In one aspect, a radio frequency (RF) gaming chip communication system includes an embodiment for communicating information with gaming chips. The embodiment comprises a memory operable to store chip information, a first antenna communicatively coupled to the memory and operable to receive a first RF signal that comprises at least previous stack information, and a second antenna operable to communicate a second RF signal that comprises the previous stack information and the chip information, where in response to the second antenna communicating the second RF signal, the first antenna is further operable to communicate an RF acknowledgement signal to the communication system that transmitted the first RF signal.

In another aspect, an embodiment may be summarized as a method for communicating information with gaming chips, comprising receiving a first RF signal that comprises previous stack information with a first antenna positioned at least proximate to a first side of a first gaming chip, combining chip information with the previous stack information to determine current stack information, transmitting a second RF signal that comprises the current stack information with a second antenna positioned at least proximate to a second side of the gaming chip, and transmitting a first RF acknowledgement signal to the communication system that transmitted the first RF signal.

In another aspect, an embodiment may be summarized as an RF gaming chip communication system, comprising a plurality of gaming chips arranged in a stack of gaming chips with a first side of each gaming chip adjacent to a second side of a next gaming chip. Each gaming chip comprises a memory operable to store chip information; a first antenna and transceiver positioned in proximity to the first side of the gaming chip and communicatively coupled to the memory, operable to respond to a first RF signal communicated by an adjacent gaming chip in the stack, wherein the first RF signal comprises previous stack information, and wherein the first antenna and transceiver are further operable to communicate the previous stack information to the memory; a second antenna and transceiver positioned in proximity to the second side of the gaming chip and communicatively coupled to the memory, and operable to transmit a second RF signal comprising current stack information, wherein the current stack information corresponds to the previous stack information and the chip information. The RF gaming chip communication system further comprises an interrogator antenna and transceiver operable to initially communicate an interrogation RF signal to the plurality of gaming chips that are arranged in a stack, wherein the gaming chip in the stack closest to the interrogator antenna and transceiver is responsive to the interrogation RF signal, and wherein other gaming chips of the stack are not responsive to the interrogation RF signal.

In another aspect, an embodiment may be summarized as a method for communicating information with gaming chips, comprising transmitting a first RF signal to a stack of gaming chips having a bottom gaming chip and at least a second gaming chip adjacent to the bottom gaming chip, and wherein the bottom gaming chip is responsive to the first RF signal and the second gaming chip is not responsive to the first RF signal; transmitting a second RF signal from the bottom gaming chip in response to the first RF signal, wherein the second RF signal comprises information corresponding to the bottom gaming chip; and transmitting a third RF signal from the second gaming chip in response to the second RF signal, wherein the third RF signal comprises information corresponding to the bottom gaming chip and the second gaming chip, and wherein the bottom gaming chip is not responsive to the third RF signal.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale and some of these elements are arbitrarily enlarged and positioned to improve drawing legibility. Further, the particular shapes of the elements, as drawn, are not intended to convey any information regarding the actual shape of the particular elements and have been solely selected for ease of recognition in the drawings.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well-known structures associated with computers, computer networks, communications interfaces, sensors and/or transducers, mechanical drive trains, and/or optical readers may not be shown or described in detail to avoid unnecessarily obscuring the description.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the claimed invention.

This description generally relates to various types of gaming environments that employ gaming chips or tokens as a currency medium. Other devices or systems associated with gaming, such as those used to automate, enhance, monitor, and/or detect some aspect of gaming establishment management or operation, may interface or otherwise communicate with the gaming chip communication system. Further, the gaming chip communication system itself may be used as a sub-element in such devices or systems.

For purposes of clarity and brevity, the gaming chip communication system described and illustrated herein may reference certain games such as blackjack. However, it is understood and appreciated that the gaming chip communication system is generally applicable to a variety of casino-type games, gaming tables, and/or operations. Further, the gaming chip communication system may be generally applicable to other recreational games that employ game chips, tokens, or the like. In addition, it is understood that the gaming chip communication system may be capable of identifying other token-like objects that do not necessarily correspond to a standard or conventional gaming chip, for example chips that are larger or smaller, shaped differently, and/or made from something other than traditional gaming chip materials.

Brief Overview of the Gaming Chip Identification System

Figure 1:
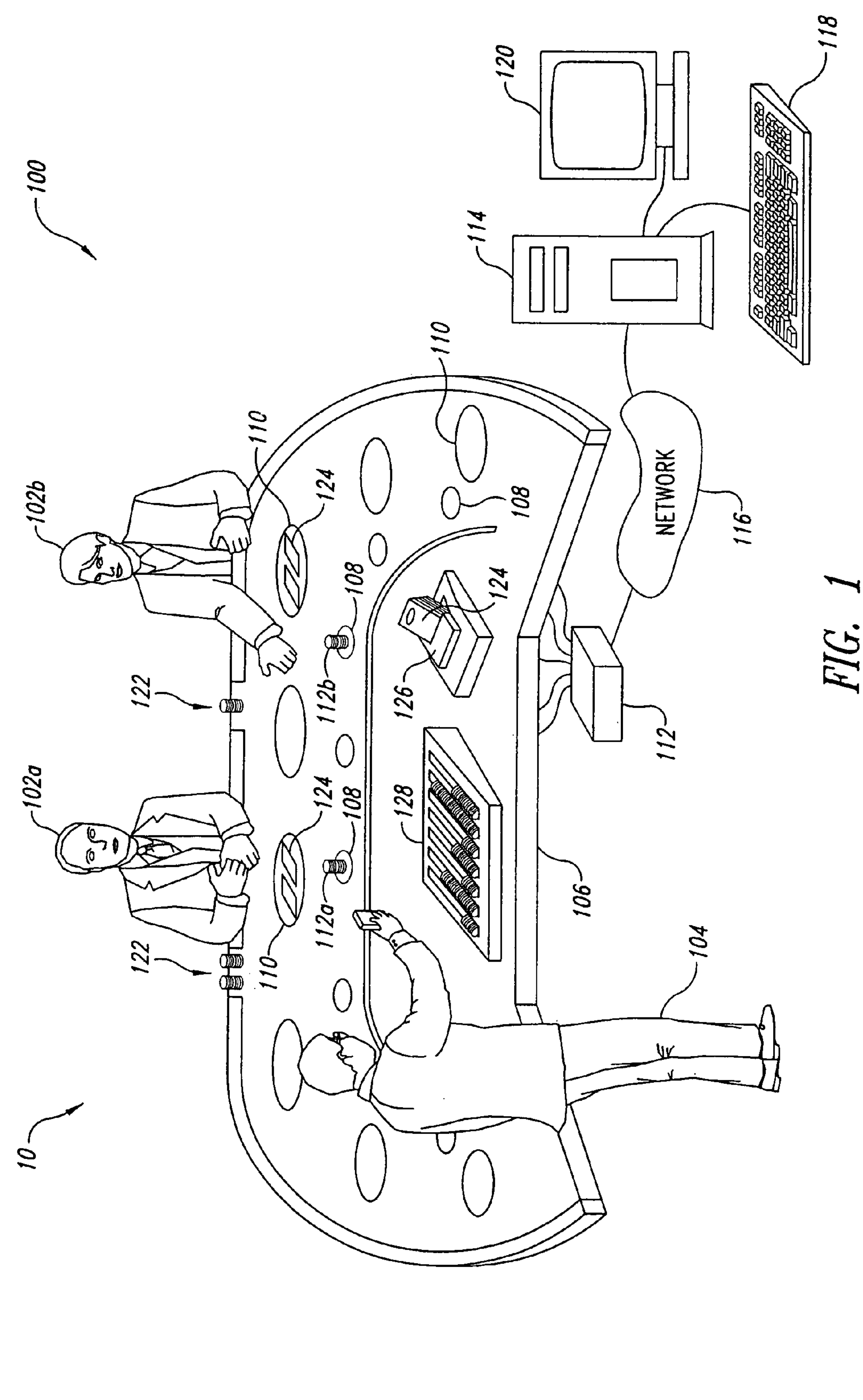
FIG. 1 is a perspective view of a gaming environment employing an embodiment of the gaming chip communication system.
Figure 2:
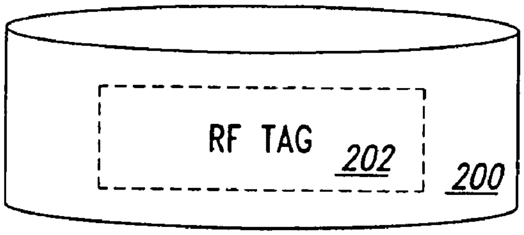
FIG. 2 is a schematic diagram illustrating a gaming chip having a radio frequency (RF) tag embodiment.

FIG. 1 is a perspective view of a gaming environment 10 employing an embodiment of the gaming chip communication system 100. FIG. 2 is a schematic diagram illustrating a gaming chip 200 having a radio frequency (RF) tag 202. For convenience and clarity, individual gaming chips 200 illustrated in FIG. 1 are not individually labeled with reference numerals. Furthermore, it is understood that a single gaming chip 200 may be referred to as a "stack" in the context of this disclosure.

The illustrated exemplary embodiment of gaming communication system 100 is illustrated in the context of a table game such as blackjack. Accordingly, two players **102*a* and 102*b* are playing a blackjack game dealt by dealer 104 onto gaming table 106. Each player 102*a*, 102*b* is positioned in front of a portion of the gaming table 106 that has illustrated thereon a plurality of betting areas 108 and card play areas 110**.

The gaming chip communication system 100 comprises a means to communicate with gaming chips 200, a communication unit 112, and a processing system 114. Communication unit 112 and processing system 114 communicate with each other via network 116. Processing system 114 may include various user interface means, such as a keyboard 118, a display 120 or the like.

Generally, the betting area 108 is a marked portion of the gaming table 106 where players **102*a* and/or 102*b* may place their respective gaming chips 200 and/or money that is used for the bet or wager of the current game. The betting areas 108 are marked such that bets within the marked betting areas 108 are understood as being the bets for the current game. Gaming chips 200 or currency outside of betting area 108 are understood as not being part of the bet for the current game. Accordingly, the stacks 112*a* of gaming chips 200 in front of player 102*a* and within the betting area 108 are understood to be his current bet, and the stack 112***b* of gaming chips 200 in front of player 102*b* and within the betting area 108 are understood to be his current bet. Stacks 122 are understood not to be bet in the current game.

The dealer 104 retrieves cards 124 from a card shoe 126 or the like, and then deals the retrieved cards 124 into the respective card play areas 110*a*, 110*b* for the players 102*a*, 102*b*. Gaming chips 200 may be stored in a chip tray 128 so that gaming chips 200 may be conveniently retrieved for payout of winning bets and storage of gaming chips 200 taken after losing bets.

As will be described in greater detail hereinbelow, gaming chips 200 in the stacks 122*a*, 122*b* are in proximity to one or more interrogator antennas 406 (FIG. 4) when in the betting area 108. A radio frequency (RF) signal facilitates chip-to-chip communication between the gaming chips 200 of the stacks 122*a*, 122*b*. In the various embodiments, only the adjacent gaming chips 200 in a common stack communicate with each other. Non-adjacent gaming chips 200 do not communicate with each other or with gaming chips 200 in other stacks.

In the embodiment illustrated in FIG. 1, gaming chips 200 in stack 122*a* do not communicate with gaming chips 200 in stack 122*b*. In one embodiment, the power density of the transmitted RF signals is not sufficient for the gaming chips 200 in stack 122*b* to respond to the RF signal. For example, detected signals from gaming chips in stack 122*a* will be less than a threshold or the like such that gaming chips in adjacent stack 122*b* do not respond to the RF signals generated by chips of stack 122*a*. Accordingly, the well understood problem of "signal collision" by the various embodiments of the gaming chips 200 is avoided. In some embodiments, the material of the gaming chip attenuates incident RF signals such that the transceivers and antennas in that gaming chip are not responsive to RF signals attenuated below a threshold.

Summarizing, RF communications between adjacent gaming chips 200 in a common stack 112 occurs without signal collision. Furthermore, even when a plurality of stacks 112 of gaming chips 200 are adjacent to each other in the same betting area 108, only adjacent gaming chips 200 in a common stack 112 communicate with each other, thereby avoiding signal collision with RF signals generated by other gaming chips 200 in adjacent stacks. The communication process used by various embodiments of the gaming chip communication system 100 which enables chip-to-chip communication without signal collision is described in greater detail hereinbelow.

Gaming Table Communication System

Figure 3:
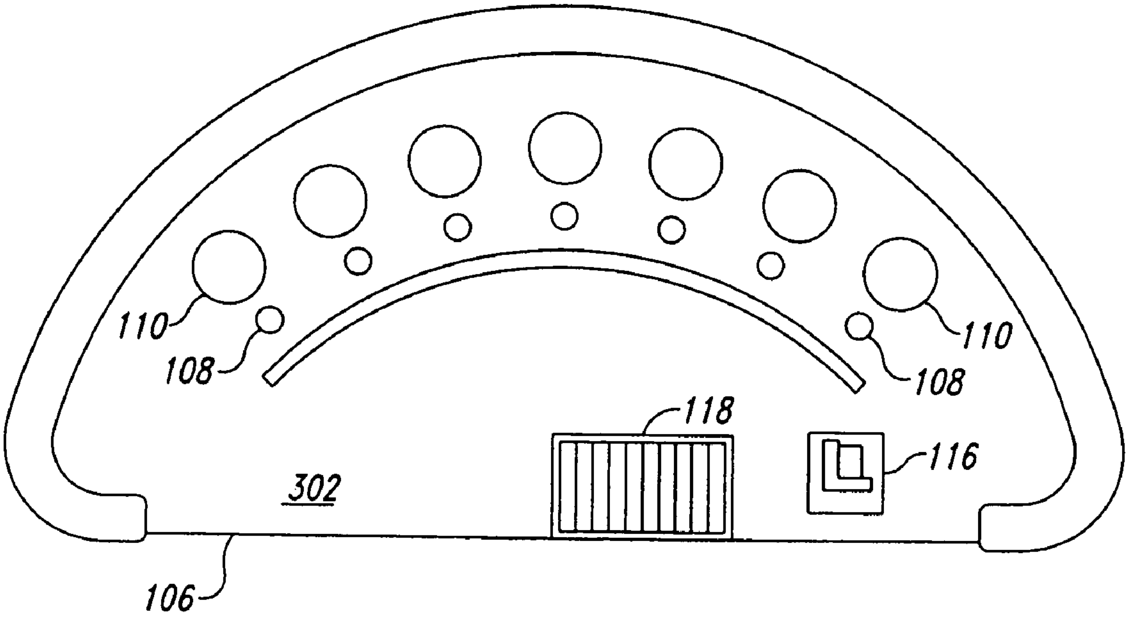
FIG. 3 is a top plan view of the surface of the gaming table of FIG. 1.
Figure 4:
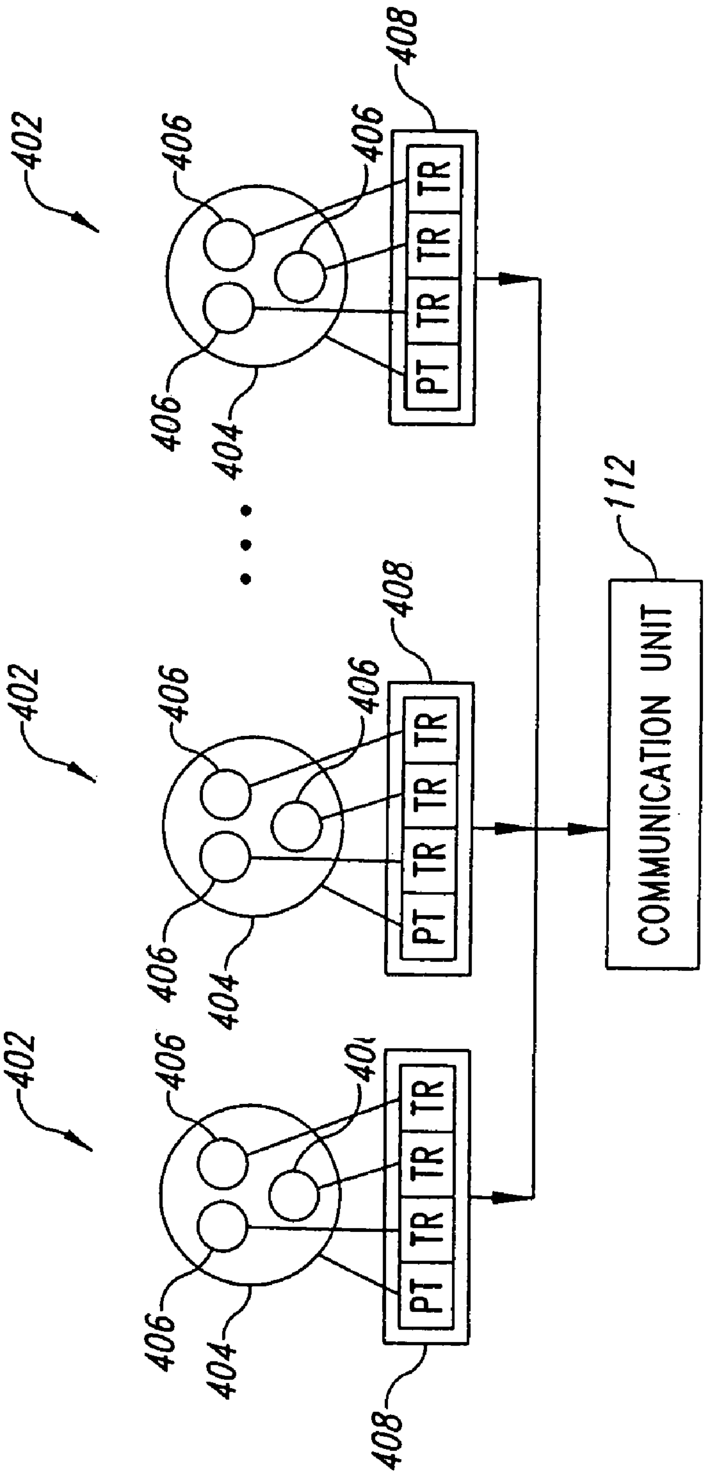
FIG. 4 is an electrical schematic diagram showing a portion of an embodiment of the gaming chip communication system coupled to or residing within the gaming table of FIGS. 1 and 3.

FIG. 3 is an overhead view of the surface of a typical blackjack gaming table 106. FIG. 4 is an electrical schematic diagram showing a portion of an embodiment of the gaming chip communication system 100 coupled to or residing within the gaming table 106.

Seven groups of betting areas 108 and card play areas 110 are identified on the gaming table cover 302 which covers the playing area of the gaming table 106. As noted above, bets for the current game are made by placing one or more gaming chips 200 onto a betting area 108 (FIGS. 1 and 3). The betting area 108 is typically marked with a visible indicia or the like on the cover 302 so that a player 102 knows exactly where gaming chips 200 must be placed for valid bets during a game.

In immediate proximity to each betting area 108 are a plurality of antennas 402, described in greater detail below. The antennas 402 may lie underneath the cover 302 in one embodiment. In other embodiments, the group of antennas 402 may be embedded in the gaming table 106, may be embedded within the table cover 302, or may be part of an indicia, such as a label or the like, which identifies a betting area 108 on the gaming table cover 302.

One of the antennas 402 is a power transmission antenna 404. Power transmission antenna 404 is coupled to a transmitter, referred to as the power transmitter (PT) for convenience. The power transmitter PT transmits an electromagnetic signal upward above the betting area 108 to the gaming chips 200. The power density of the RF signal remains sufficient, at least for a distance equal to the maximum height of a stack 112 of gaming chips 200, so that each gaming chip 200 in a stack 112 is operable to convert a portion of the transmitted electromagnetic signal into an amount of electrical energy that is sufficient to power the components of the gaming chip 200. When one or more stacks 112 of gaming chips 200 are placed in a betting area 108, each of the gaming chips 200 of each stack 112 will receive sufficient electromagnetic energy for their power requirements.

Each group of antennas 402 further includes at least one interrogator antenna 406. For convenience, three interrogator antennas 406 are illustrated in each of the groups of antennas 402. A transceiver (TR) is coupled to each interrogator antenna 406 in the illustrated embodiment of FIG. 4. Transceiver TR communicates a relatively low power RF signal, emitted by its respective interrogator antenna 406, such that only the bottom chip 200 of a stack 112 that is in proximity (above) the interrogator antenna 406 is responsive to the emitted RF signal. The RF signal emitted by an interrogator antenna 406 is referred to hereinafter as the interrogation signal for convenience.

The relative area encompassed by the three illustrated interrogator antennas 406 of an antenna group 402 corresponds to the size of a betting area 108. That is, if one or more stacks 112 of gaming chips 200 is placed in a betting area 108, the bottom gaming chip 200 of each stack 112 will be close enough to at least one of the interrogator antenna 406 to receive at least one interrogation signal.

For convenience, the power transmitter TP and the transceivers TS are illustrated as separate components aggregated in a common unit 408. The common unit 408 may be a single fabricated integrated circuit chip, a common enclosure where the power transmitter TP and the transceivers TS reside, or a suitable rack or shelf system where a power transmitter TP and a plurality of transceivers TS may be conveniently coupled to their respective antennas.

Since each gaming table 106 is likely to have a plurality of individual betting areas 108 and/or other areas of interest where an antenna group 402 is located, a communication unit 112 may be optionally used to process communications received from the transceivers TR. Communication unit 112 may then communicate with processing system 114.

Gaming Chip RF Tag

Figure 5:
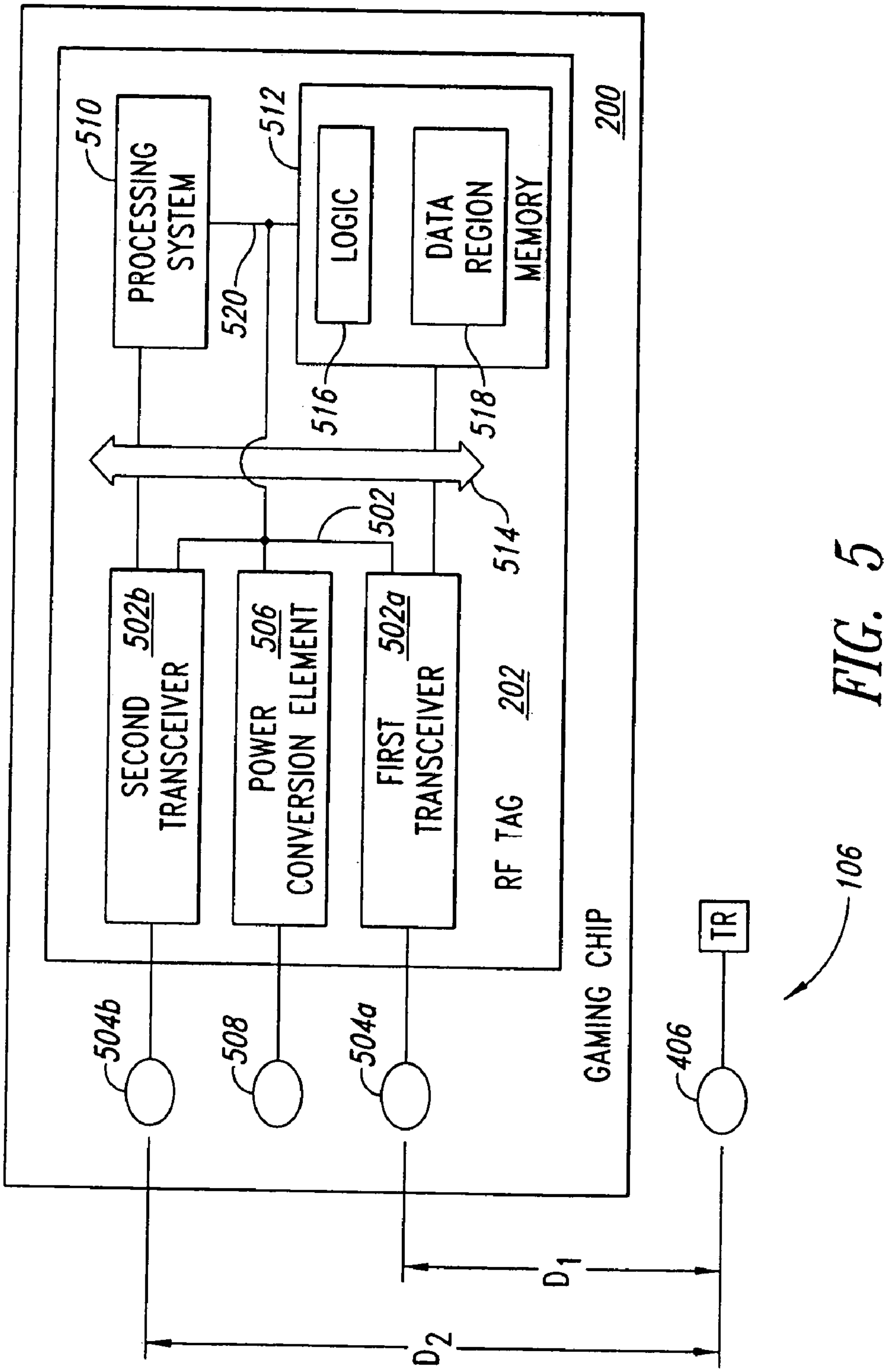
FIG. 5 is a block diagram illustrating in greater detail components of the gaming chip embodiment illustrated in FIG. 2.

FIG. 5 is a block diagram illustrating in greater detail components of the gaming chip 200 (FIG. 2). RF tag 202 comprises a first transceiver 502*a* coupled to a first antenna 504*a*, a second transceiver 502*b* coupled to a second antenna 504*b*, a power conversion element 506 coupled to a power receiving antenna 508, a processing system 510, and a memory 512. Some embodiments of the gaming chips 200 are made of a material that attenuates received signals such that when incident RF signals are above a threshold power density, the first transceiver 502*a* and antenna 504*a*, and/or second transceiver 502*b* and antenna 504*b*, are responsive to the incident RF signal.

The transceivers 502*a*, 502*b*, processing system 510, and memory 512 are communicatively coupled to each other via communication bus 514. In alternative embodiments of a gaming chip 200, the above-described components may be communicatively coupled in a different manner than illustrated in FIG. 5. For example, one or more of the above-described components may be directly coupled to each other or may be coupled to each other via intermediary components (not shown). In some embodiments, communication bus 514 is omitted and components are coupled directly to each other using suitable connections.

Memory 512 includes logic 516 for performing the various information processing and communication operations described herein. Memory 512 also includes a data region 518 for storing information of interest, such as, but not limited to, the value of the chip 200 and/or a serial number or other identifier which uniquely identifies the gaming chip 200. Other information of interest may be stored in the data region 518, such as, but not limited to, manufacture information, use history, etc.

As noted above, the power transmission antenna 404 (FIG. 4) transmits electromagnetic energy that is used to provide power for the components of the RF tag 202. Power receiving antenna 508 receives a portion of the emitted electromagnetic energy and communicates the received electromagnetic energy to power conversion element 506. Power conversion element 506 converts the received electromagnetic energy into electric energy. The energy is transmitted to the first transceiver 502*a*, the second transceiver 502*b*, the processing system 510, and the memory 512 via connections 520. If other components (not shown) in the RF tag 202 require power, such components may receive their power from power conversion element 506. Such power conversion systems are known and are not described in detail herein for brevity.

Also illustrated in FIG. 5 is one of the above-described transceivers (TR) and its associated interrogator antenna 406. In the various embodiments, the transceiver TR in the gaming table 106 transmits a relatively low power RF interrogation signal. At a distance at least equal to $D_1$, the power density of the RF interrogation signal is sufficient such that the first transceiver 502*a* and antenna 504*a* are responsive to the RF interrogation signal. However, at a distance $D_2$, the power density has decreased such that the second transceiver 502*b* and antenna 504*b* are not responsive to the RF interrogation signal. (In some embodiments, the material of the gaming chip 200 may also attenuate the interrogation signal as it passes through the gaming chip 200 to a point where the second transceiver 502*b* and antenna 504*b* are not responsive to the RF interrogation signal emitted by the interrogator antenna 406.)

In alternative embodiments, signal strength may be determinable such that the first transceiver 502*a* and first antenna 504*a* respond to the interrogation signal, while the second transceiver 502*b* and antenna 504*b* do not respond to the RF interrogation signal. That is, although the second transceiver 502*b* and antenna 504*b* do "respond" to the received signal in that a received signal is communicated from the second transceiver 502*b* and antenna 504*b*, the processing system 510 and/or logic 516 is operable to recognize that the signal detected by the second transceiver 502*b* and antenna 504*b* should not be responded to. For the purposes of this disclosure and the claims, in such embodiments, the second transceiver 502*b* and antenna 504*b* are said to "not respond" to the received signal for convenience.

In other embodiments, the received signal may be sufficiently weak that the signal cannot be reliably discerned by the second transceiver 502*b* and antenna 504*b*, or other signal processing system. The differences in detected signal strength between the first transceiver 502*a* and antenna 504*a* and the second transceiver 502*b* and antenna 504*b* arise in part due to free space signal strength degradation and/or in part due to signal attenuation caused by the chip material (if the chip material has signal attenuating characteristics). For purposes of this disclosure and claims, although the second transceiver 502*b* and antenna 504*b* do "respond" to the received signal in that a received signal is communicated from the second transceiver 502*b* and antenna 504*b*, a transceiver and/or antenna is "not responsive" if the strength of a received signal is so low that information in the signal is not meaningfully or accurately discernable by the processing system 510 and/or by logic 516.

During a table game where a gaming chip 200 is used for betting, the gaming chip is presumed to be laying flat on the surface of the betting area 108. Thus, the first transceiver 502*a* and antenna 504*a* are illustrated on the bottom portion of the gaming chip 200 in proximity to the interrogator antenna 406 such that the second transceiver 502*b* and antenna 504*b* are not responsive to the RF interrogation signal. It is understood that if the horizontal orientation of the gaming chip 200 is reversed, the second transceiver 502*b* and antenna 504*b* would be on the "bottom" portion of the gaming chip 200 in proximity to the interrogator antenna 406 such that the first transceiver 502*a* and antenna 504*a* will not be responsive to the RF interrogation signal. In either orientation, the transceiver and antenna closest to the interrogator antenna 406 is responsive to the RF interrogation signal. The transceiver and antenna farthest from the interrogator antenna 406 (corresponding to distance $D_2$) are not responsive to the RF interrogation signal.

Chip-to-Chip Communication Protocol

Figure 6:
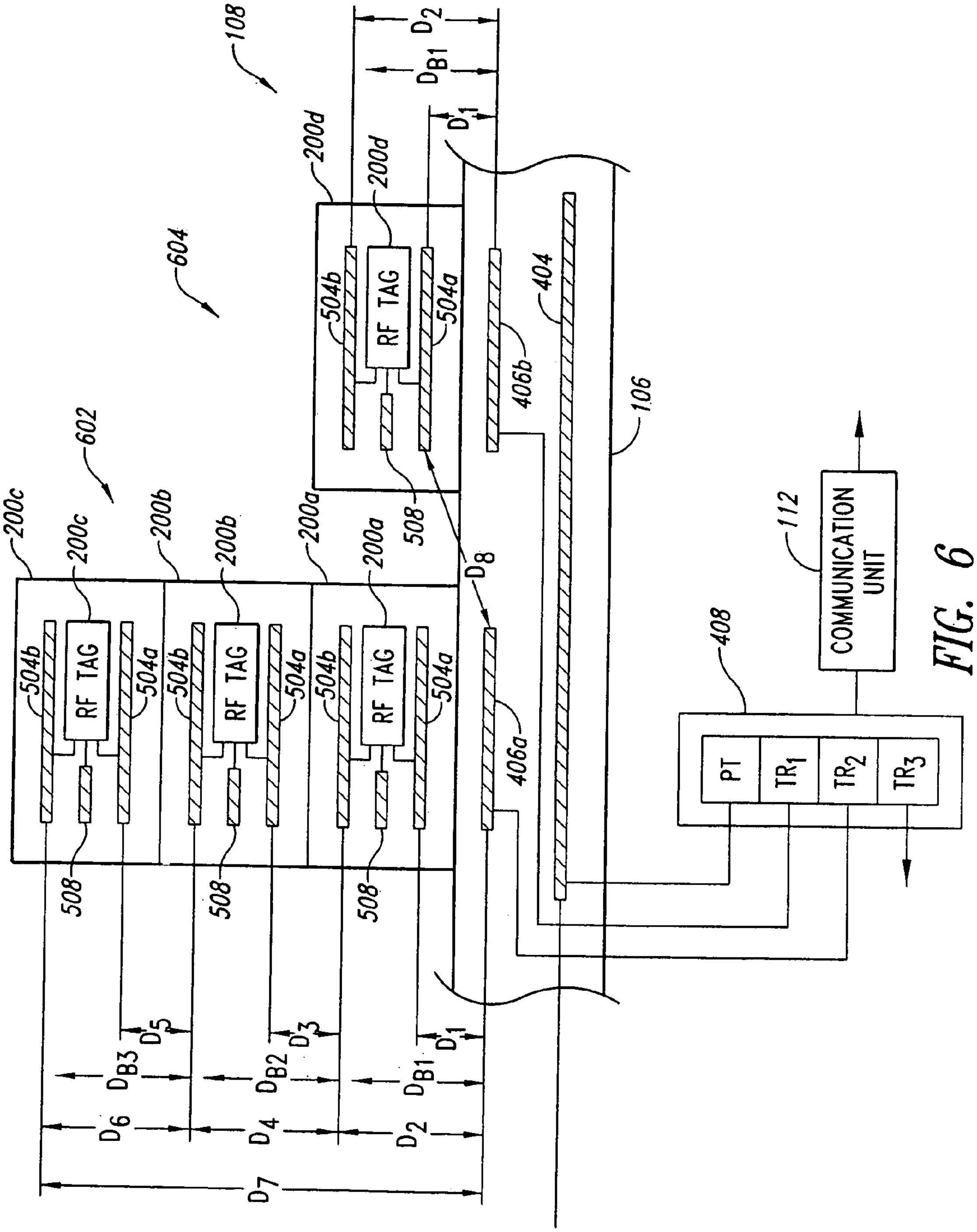
FIG. 6 is a block diagram of a plurality of gaming chips oriented on one of the betting areas illustrated in FIG. 1.

FIG. 6 is a block diagram of a plurality of gaming chips 200*a-d* oriented on one of the betting areas 108 illustrated in FIG. 1. Gaming chips 200*a*-200*c* form a first stack 602 of three chips and gaming chip 200*d* forms a second stack 604 of a single chip. The gaming chips 200*a*-200*c* are illustrated in FIG. 6 as being placed in a single betting area 108.

At some point during the game, such as before the start of a current game and/or after the period for player betting has ended, it may be desirable to determine information about the gaming chips 200*a*-200*c* in the betting area 108. For example, it may be desirable to determine the total value of the gaming chips 200 in the first stack 602 and/or second stack 604, determine the value of all gaming chips 200 that may be within the betting area 108, or determine other information of interest such as serial numbers or the like of the gaming chips 200*a*-200*c*. It is appreciated that the gaming chip communication system 100, prior to the process of determining information about the gaming chips 200 in the betting are 108, will likely have no a priori knowledge of the information (such as value or identification information). That is, there could be any number of gaming chips 200 and/or number of chip stacks in the betting area 108. (Alternatively, the information could already be known from a prior determination and the current determination of information could be used for validation purposes.)

The chip-to-chip communication process using a signal protocol is now described in detail. An initial interrogation signal (a first RF signal) is transmitted from interrogator antennas 406*a*, 406*b* in response to some predetermined condition, such as, but not limited to, conclusion of a betting period or the like. The predetermined condition may be based upon some automatic device, or may be based upon some manual action by the dealer or other authorized person.

As noted above, due to free space loss and/or signal attenuation caused by the gaming chip material, a gaming chip transceiver 502 and antenna 504 may be responsive to an interrogation signal out to at least the distance $D_1$, but not as far as the distance $D_2$. This distance is denoted as $D_{B1}$ (first broadcast distance) in FIG. 6. Accordingly, the transceiver 502*a* (FIG. 5) and antenna 504*a* of gaming chip 200*a* is responsive to an interrogation signal from interrogator antenna 406*a* because at least the antenna 504*a* of gaming chip 200*a* is less than the distance $D_{B1}$ from the interrogator antenna 406*a*. Similarly, the transceiver 502*a* and antenna 504*a* of gaming chip 200*d* receives and/or is responsive to an interrogation signal from interrogator antenna 406*b* because at least the antenna 504*a* of gaming chip 200*d* is less than the distance $D_{B1}$ from the interrogator antenna 406*b*.

Also of note, since the distance $D_8$ is greater that the distance $D_{B1}$, the transceiver 502*a* and antenna 504*a* of gaming chip 200*d* would not be responsive to the interrogation signal from interrogator antenna 406*a*. Similarly, the transceiver 502*a* and antenna 504*a* of gaming chip 200*a* would not be responsive to the interrogation signal from interrogator antenna 406*b*. That is, because the distance at which a transceiver 502 and antenna 504 are responsive to an interrogation signal is limited, a plurality of interrogator antennas 406 may be used to provide sufficient signal coverage area for the betting area 108 and/or another area of interest on the betting table 106.

Continuing with the exemplary chip-to-chip communication process, the first transceiver 502*a* and antenna 504*a* of the first (or bottom) gaming chip 200*a* responds to the initial interrogation signal (the first RF signal). After the interrogating signal is received, the first transceiver 502*a* (FIG. 5) communicates a signal to the processing system 510 or to memory 512, depending upon the embodiment. The communicated signal from the first transceiver 502*a* corresponds to a request for information from the gaming chip 200.

Associated with the request for information is at least one parameter that corresponds to, or is indicative of, the value of any gaming chips 200 below the current gaming chip that is receiving the request for information. For convenience, this value or parameter is referred to as the received stack value. Initially, gaming chip 200*a* is the first chip of the stack 602 such that the received stack value is zero or absent.

Upon receiving the request for information from the first transceiver 502*a*, the processing system 510 retrieves a value associated with the gaming chip 200*a* from data region 518 and adds the retrieved value to the received stack value to determine a new current stack value (now equal to the value of gaming chip 200*a* since it is the first gaming chip in stack 602).

Processing system 510 then generates and communicates a current stack value signal (corresponding to a current stack value, which is now equal to the value of gaming chip 200*a*) to the second transceiver 502*b* of gaming chip 200*a*. The second transceiver 502*b* of gaming chip 200*a* causes the antenna 504*b* to communicate a second RF signal. The second RF signal comprises a request for information from the next gaming chip in the stack 602.

This second RF signal is also a relatively low power signal. The transceiver 502*a* and antenna 504*a* of the gaming chip 200*b* are at a distance $D_3$ from the antenna 504*b* of gaming chip 200*a*. Due to free space loss and/or signal attenuation from the gaming chip material, the first transceiver 502*a* and antenna 504*a* of the second gaming chip 200*b* are responsive to the transmitted second RF signal.

Because the transceiver 502*b* and second antenna 504*b* of the second gaming chip 200*b* are at a distance a distance $D_4$ from the antenna 504*b* of gaming chip 200*a*, the transceiver 502*b* and second antenna 504*b* of the second gaming chip 200*b* are not responsive to the transmitted second RF signal. For convenience, this distance may be generally represented by the distance $D_{B2}$ (second broadcast distance). Similarly, the transceivers 502 *a* and 502*b*, and the antenna 504*a* and 504*b*, of the second gaming chip 200*b* are not responsive to the transmitted second RF signal because the exceed the second broadcast distance $D_{B2}$ from the antenna 504*b* of gaming chip 200*a*. Accordingly, only the second gaming chip 200*b* is responsive to the second RF signal transmitted by the first gaming chip 200*a*.

In response to the transceiver 502*a* and antenna 504*a* of the second gaming chip 200*b* responding to the second RF signal transmitted by the gaming chip 200*a*, the first transceiver 502*a* (FIG. 5) of the second gaming chip 200*b* communicates a signal to its respective processing system 510 or to memory 512 of the second gaming chip 200*b*, depending upon the embodiment. The communicated signal corresponds to a request for information from the receiving gaming chip 200*b*. Since gaming chip 200*b* is the second chip of the stack 602, the received signal includes information corresponding to the value of the gaming chips below the current gaming chip. Here, the stack value is equal to the value of the first gaming chip 200*a*. Upon receiving the signal from the first transceiver 502*a*, the processing system 510 of the second gaming chip 200*b* retrieves a value associated with the second gaming chip 200*b* from its data region 518 and adds the retrieved value to the received stack value to determine a new current stack value (now equal to the value of gaming chip 200*a* plus the value of gaming chip 200*b*).

Processing system 510 of the second gaming chip 200*b* generates and communicates the current stack value signal (corresponding to a current stack value now equal to the total value of gaming chips 200*a* and 200*b*) to the second transceiver 502*b* of the second gaming chip 200*b*. The second transceiver 502*b* of gaming chip 200*a* causes its respective antenna 504*b* to communicate a third RF signal, such as another interrogation signal or the like. This third RF signal includes at least the current stack value and corresponds to an information request that is to be received by the third gaming chip 200*c* of stack 602.

This third RF signal is also a relatively low power signal. The transceiver 502*a* and antenna 504*a* of the gaming chip 200*c* are at a distance $D_5$ from the antenna 504*b* of gaming chip 200*b*. Accordingly, the first transceiver 502*a* and antenna 504*a* of the third gaming chip 200*c* are responsive to the transmitted third RF signal. The transceiver 502*b* and second antenna 504*b* of the third gaming chip 200*c* are not responsive to the transmitted third RF signal. For convenience, the distance may be generally represented by the distance $D_{B3}$ (third broadcast distance). Accordingly, only the third gaming chip 200*c* is responsive to the third RF signal transmitted by the second gaming chip 200*c*. Other antennas in different gaming chips 200 are not responsive to the third RF signal. More particularly, the first gaming chip 200*a* is not responsive to the transmitted third RF signal.

In response to the transceiver 502*a* and antenna 504*a* of the third gaming chip 200*c* responding to the third RF signal transmitted by the gaming chip 200*b*, the first transceiver 502*a* (FIG. 5) of the third gaming chip 200*c* communicates a signal to its respective processing system 510 or to memory 512, depending upon the embodiment. The communicated signal corresponds to a request for information from the third gaming chip 200*c*. Since gaming chip 200*c* is the third chip of the stack 602, the received stack value is equal to the total value of gaming chips 200*a* and 200*b*. Upon receiving the information request signal from its first transceiver 502*a*, the processing system 510 of the third gaming chip 200*c* retrieves a value associated with the third gaming chip 200*c* from its data region 518 and adds the retrieved value to the received stack value to determine a new current stack value (now equal to the value of gaming chip 200*a*, plus the value of gaming chip 200*b*, plus the value of gaming chip 200*c*).

Processing system 510 of the third gaming chip 200*c* generates and communicates a signal corresponding to the current stack value (now equal to the total value of gaming chips 200*a*, 200*b*, and 200*c*) to the second transceiver 502*b* of the third gaming chip 200*c*. The second transceiver 502*b* of gaming chip 200*c* causes its respective antenna 504*b* to communicate a fourth RF signal. This fourth RF signal includes at least the current stack value and corresponds to an information request signal that is to be received by the next adjacent gaming chip of stack 602.

However, the third gaming chip 200*c* is the last (top) gaming chip in the stack 602. Accordingly, the total value of the gaming chips in stack 602 has been determined. Discussed below is an acknowledgement protocol that ultimately lets the last gaming chip in a stack determine that there are no other chips to communicate to, and that causes that last gaming chip to communicate the current total value back to an interrogator antenna 406.

As an illustrative example, let chip 200*a* have a one dollar ($1) denomination, chip 200*b* have a five dollar ($5) denomination, and chip 200*c* have a ten dollar ($10) denomination. Initially, with respect to the interrogation signal, the current stack value is absent or equal to zero. After the first gaming chip 200*a*, the current stack value is $1. After the second gaming chip 200*b*, the current stack value is $6 ($1+$5). After the third gaming chip 200*c*, the current stack value is $16 ($1+$5+$10). As described in greater detail hereinbelow, the final stack value will be $16.

Acknowledgement Protocol

As discussed above, the processing system 510 of each gaming chip 200*a*-200*c* adds its respective value to the received stack value to determine a current stack value. Then, the processing system 510 generates and communicates the current value signal to its respective second transceiver 502*b*. The second antenna 504*b* communicates a next RF signal that is to be received by the next adjacent gaming chip 200.

The processing system 510 also generates and communicates an acknowledgement signal to its respective first transceiver 502*a*. This acknowledgement signal indicates to the previous gaming chip 200 that the previous gaming chip 200 is not the last (top) gaming chip in the stack. Accordingly, when an acknowledgement signal is received, that receiving gaming chip 200 determines that it has completed its role in the chip-to-chip communication process.

Returning to FIG. 6, an exemplary acknowledgement protocol is now described. After determining the current stack value by the gaming chip 200*a*, its respective processing system 510 generates and communicates an acknowledgement signal to its first transceiver 502*a* and first antenna 504*a* (which previously detected the initial interrogation signal). At this point in this illustrative example, the acknowledgement signal is communicated to the interrogator antenna 406*a*. An acknowledgement signal is a relatively low power RF signal that, due to free space loss and/or signal attenuation from the gaming chip material, has a limited distance for which another gaming chip 200 will be responsive to. This distance corresponds to at least distance $D_1$.

Returning now to the bottom chip 200*a* in the stack 602, upon receipt of the acknowledgement signal from gaming chip 200*a* by the interrogator antenna 406*a*, a signal is communicated back to communication unit 112 by the transceiver TR such that the gaming chip communication system 100 at least knows that one or more gaming chips 200 are present in the betting area 108 associated with the antenna 406*a*. Such information is useful for data validating purposes. In some embodiments, this received acknowledgement signal may be ignored.

Similarly, after determining the current stack value by the second gaming chip 200*b*, its respective processing system 510 generates and communicates an acknowledgement signal to its first transceiver 502*a* and first antenna 504*a* (which previously responded to the first RF signal transmitted by the first gaming chip 200*a*). This second acknowledgement signal from the second gaming chip 200*b* is communicated to the second antenna 504*b* of the first gaming chip 200*a*.

Upon receipt of the acknowledgement signal from the second gaming chip 200*b*, a signal is communicated back to processing system 510 by transceiver 502*b* such that the first gaming chip 200*a* at least knows that another gaming chip 200 is stacked on top of it. That is, gaming chip 200*a* determines the presence of gaming chip 200*b* in its respective stack 602. Gaming chip 200*a* takes no further action during the remaining portion of the chip-to-chip communication process.

In a similar manner, the second gaming chip 200*b* receives an acknowledgement signal from the third gaming chip 200*c*. Since gaming chip 200*b* determines that it is not the last gaming chip of the stack 602, gaming chip 200*b* takes no further action.

However, in this illustrative example, the third gaming chip 200*c* is the last chip in stack 602. After transmitting the above-described fourth RF signal from its second antenna 504*b*, gaming chip 200*c* waits for some predetermined period of time for an acknowledgement signal. Since there is no gaming chip on top of the third gaming chip 200*c* (it is the top-most gaming chip in stack 602), the awaited acknowledgement signal will never be detected because there is no gaming chip to initiate the awaited acknowledgement signal. Accordingly, the third gaming chip 200*c* determines that it is the last gaming chip, or topmost gaming chip, in stack 602 in this illustrated example.

Logic 516, or another suitable timing means, times a predetermined period of time. If no acknowledgement signal is received upon the expiration of the time period, processing system 510 determines that it is the last gaming chip 200 in stack 602. Thus, the current stack value, here equal to the total value of gaming chips 200*a*, 200*b*, and 200*c*, corresponds to the total value of gaming chips in stack 602. This information is now communicated back down to the interrogator antenna 406*a*, or to another suitable antenna, depending upon the embodiment. For convenience, this signal communicated from the top-most gaming chip in a stack is referred to as the "final value signal."

In other embodiments of the gaming chip communication system 100, the final value signal is passed back down the stack of gaming chips 200. Thus, in the illustrative example of FIG. 6, gaming chip 200*c* communicates the final value signal to gaming chip 200*b* (by transmitting a signal from the first antenna 504*a* of the gaming chip 200*c*, which is then detected by at least the second antenna 504*b* of the gaming chip 200*b*). Then, gaming chip 200*b* communicates the final value signal to gaming chip 200*a*. Finally, gaming chip 200*a* communicates the final value signal to the interrogator antenna 406*a*.

In one embodiment, one or both of the transceivers 502*a* or 502*b* is configured to transmit a relatively high strength RF final value signal that is detectable by the interrogator antenna 406*a*. In the illustrative example of FIG. 6, the minimum distance within which the final value signal must be detectable by the interrogation antenna 406*a* is at least equal to the sum of the distances $D_2$, $D_4$, and $D_6$. In practice, the maximum distance that a final value signal is communicated is at least equal to the maximum height anticipated for a stack of gaming chips (plus a sufficient margin of distance). Accordingly, in one embodiment, the last (top) gaming chip 200 has at least one transceiver 502*a* or 502*b* capable of transmitting a final value signal with sufficient power to reach at least one interrogator antenna 406 or another table antenna. In an alternative embodiment, a special dedicated transceiver and antenna may reside in the gaming chips 200 for the purpose of transmitting a final value signal with sufficient range to reach the interrogator antenna 406.

Overlapping Chip-to-Chip Communications

In the above described embodiments, chip-to-chip communications were generally limited between the closest antennas of adjacent gaming chips 200. For example, the second transceiver 502*b* and antenna 504*b* of the first gaming chip 200*a* was limited to communicating with the first transceiver 502*a* and antenna 504*a* of the second gaming chip 200*b*. Thus, initial orientation of gaming chips 200 in a stack did not affect the above-described chip-to-chip communications. However, in some embodiments, a communicated RF signal may be received by both the first transceiver 502*a* and antenna 504*a*, and the transceiver 502*b* and second antenna 504*b* of an adjacent gaming chip 200. Similarly, in some embodiments, the initial interrogation signal (first RF signal) may be detectable by both the first transceiver 502*a* and antenna 504*a*, and by the second transceiver 502*b* and antenna 504*b* of the first gaming chip 200 in a stack.

For example, in some embodiments, the relative size of the interrogator antenna 406, and/or position of the interrogator antenna 406, may be such that the first (bottom) gaming chip 200 of two or more stacks receives the initial interrogation signal from only one of the interrogator antennas 406. The logic 516 (FIG. 5) of the each of the first gaming chips 200 would recognize that the interrogation signal indicates that the chip-to-chip communication process is to be initiated.

Similarly, the first gaming chip 200 of two or more stacks may receive multiple interrogation signals from a plurality of different interrogator antenna 406. The logic 516 (FIG. 5) of the receiving first gaming chip 200 would recognize that the plurality of interrogation signals indicates that the chip-to-chip communication process is to be initiated.

In some alternative embodiments, the second RF signal transmitted by the first gaming chip 200*a* may also be detectable by the second transceiver 502*b* and antenna 504*b* of the second gaming chip 200*b* (for example, the case where $D_{B2}$ is at least equal to $D_4$). However, the logic 516 (FIG. 5) of the second gaming chip 200*b* would recognize that the first RF signal detected by its first transceiver 502*a* and antenna 504*a*, and by its second transceiver 502*b* and antenna 504*b*, corresponds to a single second RF signal transmitted by the first gaming chip 200*a*.

In such an embodiment, to avoid miscommunications and/or signal collisions, the third gaming chip 200*c* should not be responsive to the second RF signal transmitted by the first gaming chip 200*a*. So long as only an adjacent gaming chip 200 is responsive to the RF signal communicated from the adjacent gaming chip, the above-described chip-to-chip communications employed by the various embodiments of the gaming chip communication system 100 will operate as intended.

Alternative Communication Formats

In the various above-described embodiments, a current total stack value was determined by each of the processing systems 510 by adding the value of its respective gaming chip 200 to the received stack value. Alternatively, other information protocols or formats may be used to communication information about gaming chips 200 in a stack.

Returning to FIG. 6, for example, the first gaming chip 200*a* would communicate its value (and/or other information of interest such as a unique or non-unique identifier, for example, a serial number or the like) to the second gaming chip 200*b*. The second gaming chip 200*b* would link or associate its value (and/or other information) to the information associated with the first gaming chip 200*a*, and then transmit the linked information (e.g., linked list or stack of values) for both gaming chips 200*a* and 200*b* to the third gaming chip 200*c*. Similarly, the third gaming chip 200*b* would link or associate its value (and/or other information) to the information associated with the first gaming chip 200*a* and the second gaming chip 200*b*. At the end of the chip-to-chip communication process described above for the three gaming chips 200*a*-200*c*, the information communicated back to the interrogator antenna 406*a* could have the three separate values of the chips (and other information). Accordingly, if the values of the three gaming chips 200*a*-200*c* were communicated, processing system 114 (FIG. 1) or another suitable processing means could simply add the values together to determine the total value of stack 602. Or, if gaming chip serial numbers or other metadata is communicated in the equivalent final value signal, a look-up table or the like could be used to associate values of the gaming chips 200*a*-200*c* with the serial numbers or other identifiers such that the total value of the gaming chips 200 in a stack is determinable.

As an illustrative example, let chip 200*a* have a one dollar ($1) denomination, chip 200*b* have a five dollar ($5) denomination, and chip 200*c* have a ten dollar ($10) denomination. Initially, with respect to the interrogation signal, the current stack value is absent or equal to zero. After the first gaming chip 200*a*, the current stack value is $1. After the second gaming chip 200*b*, the current stack value is the string of values $1, $5. After the third gaming chip 200*c*, the current stack value is the string of values $1, $5, $10. Accordingly, the processing system 114 or another suitable processing system could determine the value of the stack to be $16. Alternatively, serial numbers or other suitable gaming chip identifiers could be linked or otherwise associated such that processing system 114 or another suitable processing system could determine the value of the stack to be $16. All such variations are intended to be within the scope of this disclosure.

Chip Tray Embodiments

Figure 7:
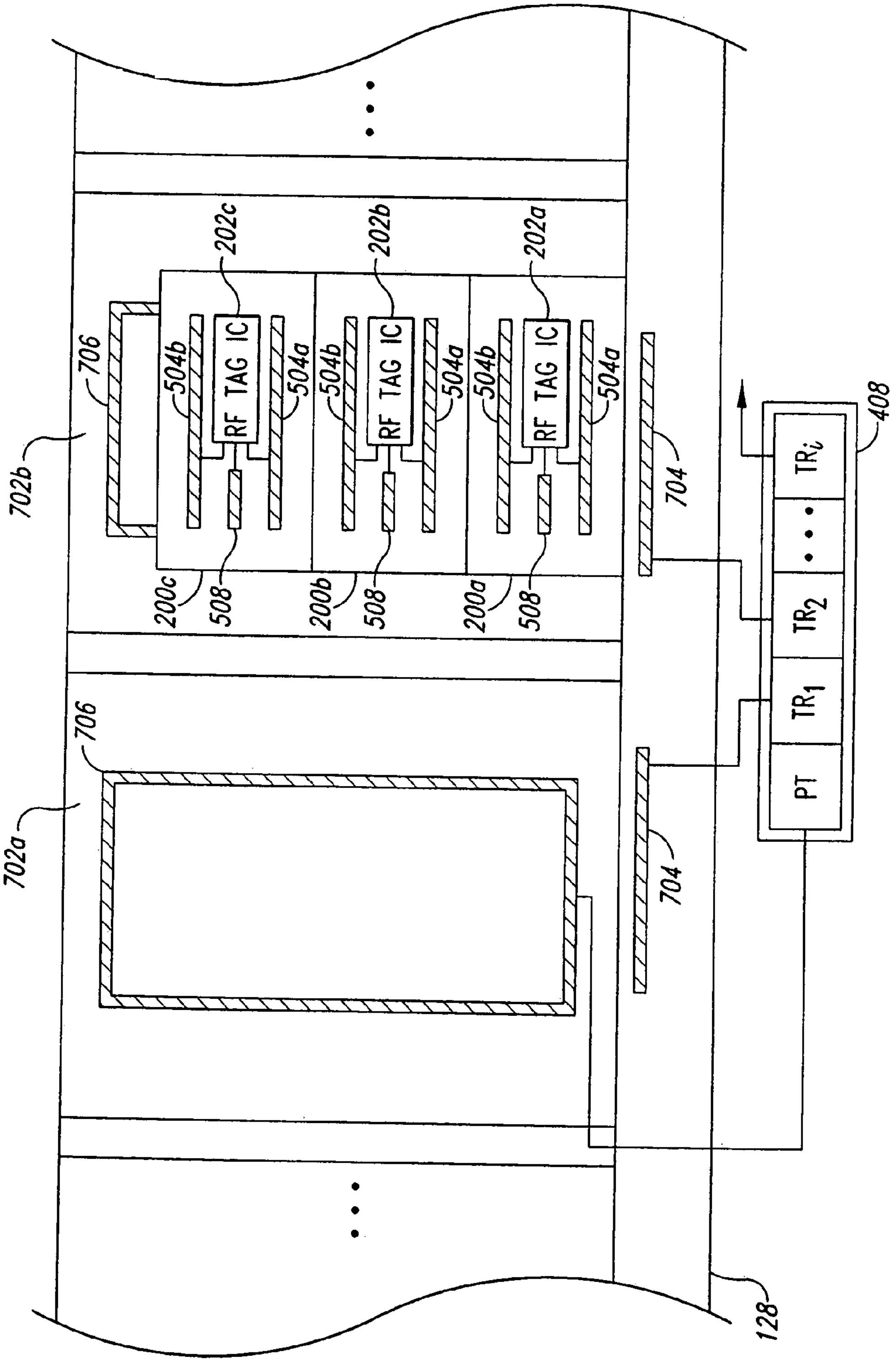
FIG. 7 is a schematic diagram illustrating a chip tray embodiment.

As noted above, gaming chips 200 may be stored in a chip tray 128 (FIG. 1) so that gaming chips 200 may be conveniently retrieved for payout of winning bets and storage of gaming chips 200 taken after losing bets. FIG. 7 is a schematic diagram illustrating a chip tray embodiment 700. Chip tray 128 may be interchangeably referred to as a chip rack. Further, the embodiment described herein is equally applicable to a portable chip tray or rack, or a carousel type tray or rack.

The illustrated portion of the chip tray 128 comprises a plurality of chip stack-trays 702, a plurality of interrogator antennas 704, at least one power transmission antenna 706, at least one power transmitter TP, and a plurality of transceivers TS. The term "stack-tray" used herein denotes a routed or formed portion of the chip tray 128 that is configured to hold a stack of chips.

The power transmitter TP and the transceivers TS are illustrated as separate components aggregated in a common unit 408, which is communicatively coupled to the above-described communication unit 112 (FIG. 1). Each chip stack-tray 702 has a transmission antenna 706 so that any gaming chips 200 residing in that particular chip stack-tray 702 may receive power, as described above.

Chip stack-tray 702*b* illustrates three gaming chips 200*a*-200*c* residing therein. The interrogator antenna 704 transmits the above-described interrogation signal to the gaming chip 200*a* to initiate the above-described chip-to-chip communication processes.

Accordingly, a plurality of gaming chips 200, which are commonly stored in chip stack-tray 702, communicate with each other such that the above-described RF signals are communicated from one gaming chip to the next until the last gaming chip 200 in chip stack-tray 702 is reached. (In the illustrative example of FIG. 7, the last gaming chip in the chip stack-tray 702*b* is gaming chip 200*c*.) Since the last gaming chip 200 in any particular chip stack-tray 702 will not receive the above-described acknowledgement signal, that gaming chip 200 will determine that the final value signal is to be transmitted back to the interrogator antenna 704 or to another suitable antenna.

For brevity, only a portion of a chip tray 128 is illustrated in FIG. 7. It is appreciated that chip stack-trays 702 are separated by a sufficient distance such that gaming chips 200 of adjacent chip stack-trays 702 do not experience signal collisions.

For convenience, each of the chip stack-trays 702 was illustrated as having its own power transmission antenna 706. Alternatively, power transmission antennas 706 may be located in other convenient locations, such as between chip stack-trays such that a power transmission antenna 706 provides power to gaming chips 200 residing in two adjacent chip stack-trays 702. Or, a larger power transmission antenna 706 might be used to provide power to gaming chips 200 residing in a plurality of chip stack-trays 702.

Other embodiments of the gaming chips 200, and the various embodiments of the communication systems and/or protocol described herein, are understood to be equally adaptable to a gaming chip tray 128. However, for brevity, the various possible alternatives are not described in detail herein. All such variations are intended to be within the scope of this disclosure.

Single Antenna Embodiments

Figure 8:
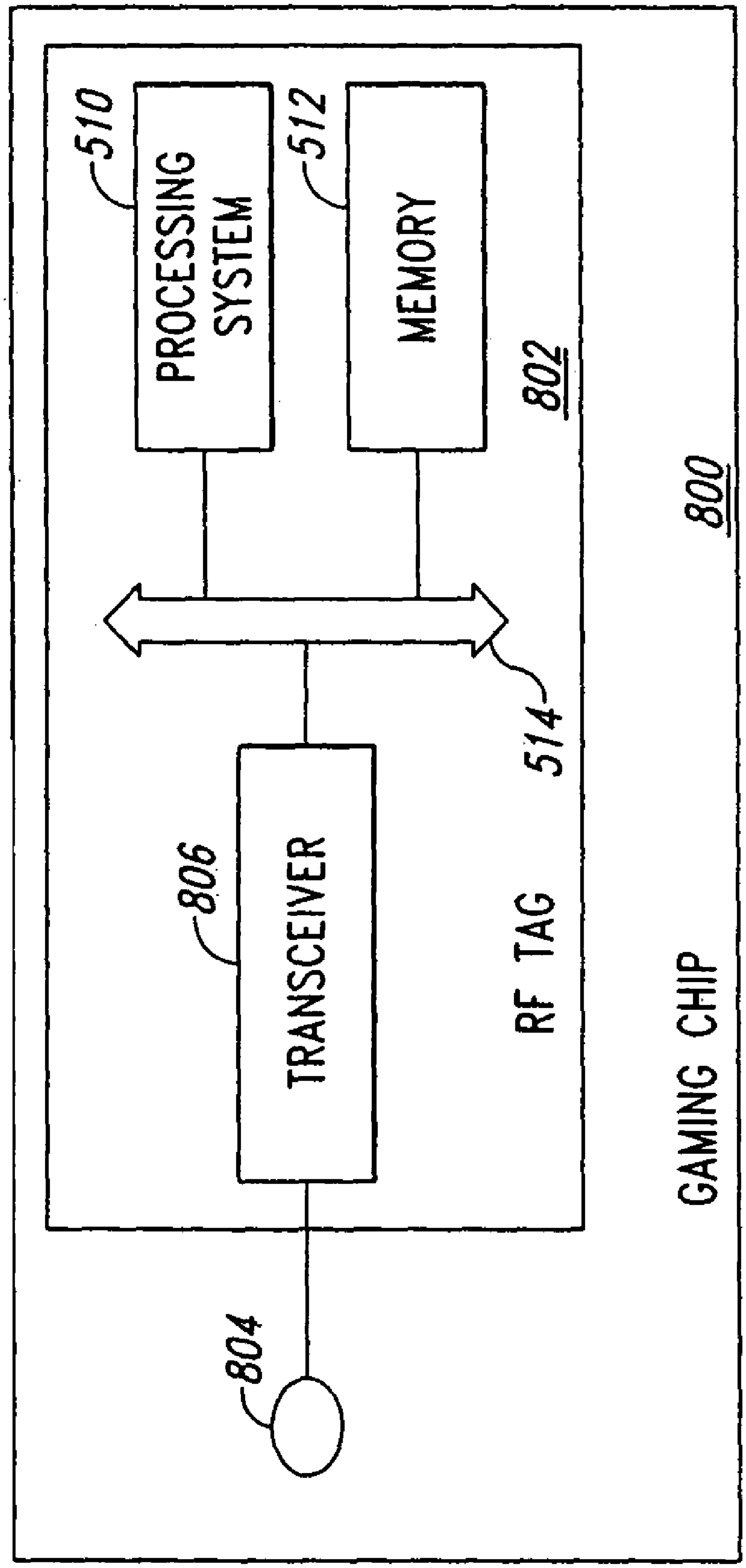
FIG. 8 is a schematic diagram illustrating a single antenna gaming chip embodiment.

FIG. 8 is a schematic diagram illustrating a gaming chip 800 embodiment comprising a communication antenna 804, a transceiver 806, a processing system 510, a memory 512, and communication bus 514. Processing system 510, memory 512, and communication bus 514 are not described again for brevity. Also, the above-described power receiving antenna 508 and power conversion element 506 are employed by the gaming chips 800, but are not described again or illustrated in FIG. 8 for brevity.

Gaming chips 800 employ the above-described acknowledgement protocol so that preceding adjacent chips can determine that there are adjacent gaming chips to communicate with, or so that the last gaming chip 800 of a stack can determine that it is the last gaming chip 800. However, in contrast to the above-described gaming chip 200 embodiments employing two antennas and transceivers, the gaming chip 800 embodiments employing the single communication antenna 804 and the single transceiver 806, which are operable to respond to RF signals from a lower gaming chip 800, are operable to transmit another RF signal to the next gaming chip 800 in a stack after the current stack value is determined by that gaming chip 800, and are operable to transmit the above-described acknowledgment signal back to the lower gaming chip 800. An illustrative example is provided below to describe the chip-to-chip communications used by embodiments of the gaming chip 800.

Figure 9:
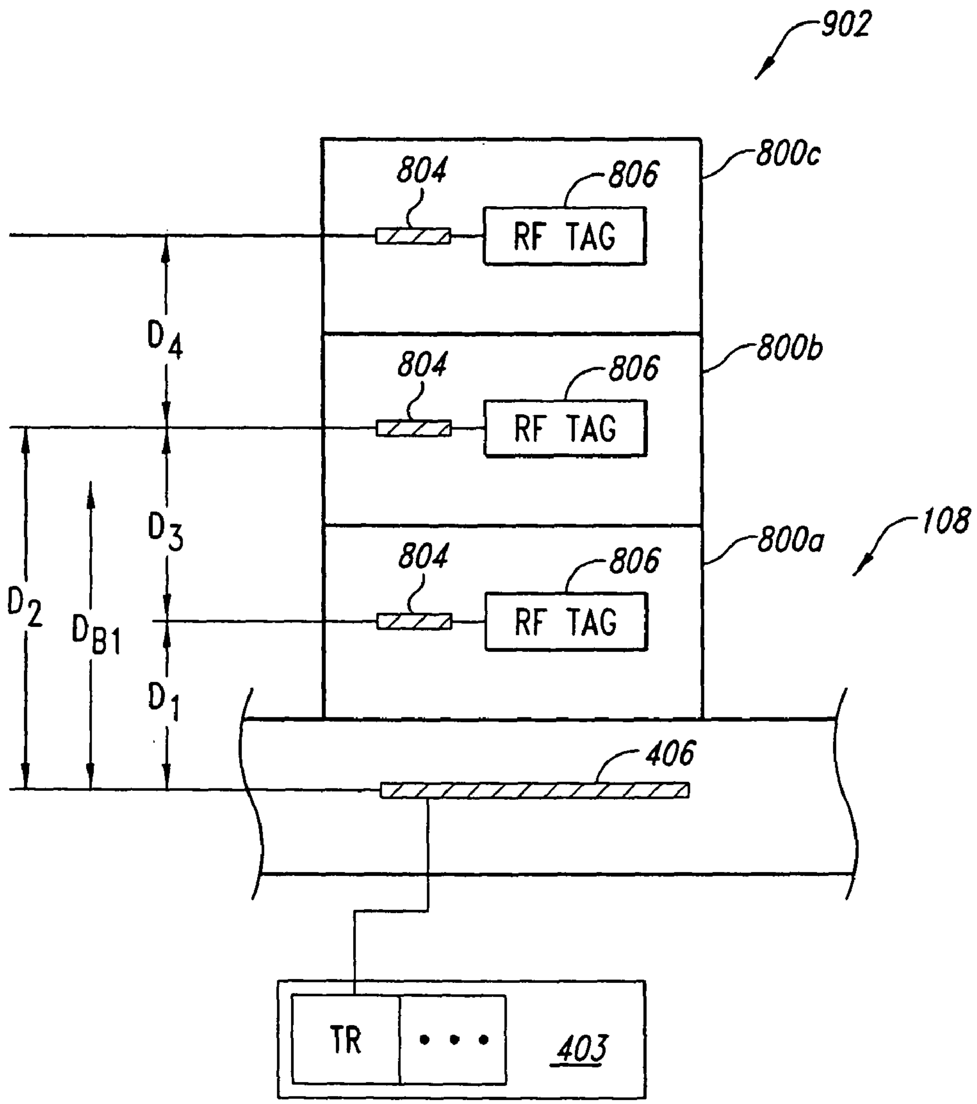
FIG. 9 is a block diagram of a plurality of single antenna gaming chips of FIG. 8 oriented on one of the betting areas illustrated in FIG. 1.

FIG. 9 is a block diagram of a plurality of gaming chips 800*a*-800*c* oriented on one of the betting areas 108 illustrated in FIG. 1. Similar to the above-described chip-to-chip communication process for gaming chips 200, at some point during the game, such as before the start of a current game and/or after the period for player betting has ended, it may be desirable to determine information about the gaming chips 800*a*-800*c* in the betting area 108.

An initial interrogation signal (a first RF signal) is transmitted from interrogator antenna 406 in response to some predetermined condition, such as, but not limited to, conclusion of a betting period or the like. As noted above, the transceiver TR transmits a relatively low power interrogation signal. Due to free space loss and/or signal attenuation from the gaming chip material, a gaming chip 200 must be within at least the distance $D_1$, but not as far as the distance $D_2$, for that gaming chip 200 to be responsive to an interrogation signal. Accordingly, the antenna 804 and transceiver 806 of gaming chip 800*a* respond to an interrogation signal from interrogator antenna 406.

The first (or bottom) gaming chip 800*a*, upon responding to the initial interrogation signal, initiates the chip-to-chip communication process. The antenna 804 and transceiver 806 respond to the initial interrogation signal (the first RF signal). Then, the transceiver in transceiver 806 (FIG. 6) communicates a signal to the processing system 510 or memory 512 (FIG. 5), depending upon the embodiment. The communicated signal corresponds to a request for information from the receiving gaming chip. Associated with the information request is a parameter corresponding to the value of the stack. Since gaming chip 800*a* is the first chip of the stack 902, the received parameter corresponds to a zero stack value. Upon receiving the information request from the transceiver 806, the processing system 510 retrieves a value associated with the gaming chip 800*a* from data region 518 and adds the retrieved value to the received stack value to determine a new current stack value (now equal to the value of gaming chip 800*a*).

Processing system 510 generates and communicates the current stack value information (corresponding to a current stack value now equal to the value of gaming chip 800*a*) to the transceiver 806 of gaming chip 800*a*, which causes its respective antenna 804 to communicate a second RF signal.

This second RF signal is also a relatively low power signal. The second gaming chip 800*b* is responsive to the transmitted second RF signal. The maximum distance of detectability of the second RF signal is less than distance $D_4$ such that the second antenna 504*b* of the second gaming chip 200*b* does not respond to the transmitted second RF signal.

In response to the antenna 804 and transceiver 806 of the second gaming chip 800*b* responding to the second RF signal transmitted by the gaming chip 800*a*, the transceiver in the transceiver 806 (FIG. 8) of the second gaming chip 800*b* communicates a signal to its respective processing system 510 or memory 512 (FIG. 5), depending upon the embodiment. The communicated signal corresponds to a request for information from the receiving gaming chip such that a new current stack value is determined (now equal to the value of gaming chip 800*a* plus the value of gaming chip 800*b*) in the manner described above. Next, the current stack value determined by the gaming chip 800*b* is communicated in a third RF signal by the antenna 804 of the second gaming chip 800*b*.

This third RF signal includes at least the current stack value and corresponds to an information request that is to be received by the third gaming chip 800*c* of stack 902.

This third RF signal is also a relatively low power signal such that the antenna 804 and transceiver 806 of the third gaming chip 800*c* are responsive to the transmitted third RF signal. Other gaming chips 800 that are above the third gaming chip 800*c* would not be responsive to the third RF signal due to free space loss and/or signal attenuation from the gaming chip material.

Additionally, the first gaming chip 800*a* would receive the transmitted third RF signal. Information in the third RF signal would be included to indicate to the first gaming chip 800*a* that the second gaming chip 800*b* has received the previously-transmitted second RF signal. Accordingly, the first gaming chip 800*a* determines that it is not the last gaming chip 800 of the stack 902. Thus, the third RF signal received by the first gaming chip 800*a* corresponds to the above-described acknowledgement signal.

When the antenna 804 and transceiver 806 of the third gaming chip 800*c* responds to the third RF signal transmitted by the gaming chip 800*b*, the transceiver in the transceiver 806 (FIG. 8) of the third gaming chip 800*c* communicates a signal to its respective processing system 510 or memory 512 (FIG. 5), depending upon the embodiment. The communicated signal corresponds to a request for information from the receiving third gaming chip 800*c* such that a new current stack value is determined (now equal to the value of gaming chips 800*a*, 800*b*, and 800*c*), as described above. Next, the above-described current stack value information determined by gaming chip 800*c* is communicated in a fourth RF signal by the antenna 804 of the third gaming chip 800*c*. This fourth RF signal includes at least the current stack value and corresponds to an information request signal that is to be received by the next gaming chip of stack 902.

However, the third gaming chip 800*c* is to last (top) gaming chip in the stack 902. Accordingly, the total value of the gaming chips in stack 902 has been determined. Since the third gaming chip 800*c* does not detect a subsequent RF signal (that would otherwise be transmitted by a gaming chip above it), the third gaming chip 800*c* determines that it is the last gaming chip 800 of the stack 902 after some elapsed period of time. Accordingly, the last gaming chip 800*c* communicates the current total value back to an interrogator antenna 406 or another suitable antenna in any of the manners described herein.

Other Alternative Embodiments

FIG. 4 illustrates three interrogator antennas 406 coupled to individual transceivers TR. In alternative embodiments, less than three, or more than three, interrogator antennas 406 may be employed to provide adequate signal coverage to a betting area 108 (FIG. 1). Further, interrogator antennas 406 may be placed in other areas of interest to emit an interrogation signal that is received by the bottom chip 200 of a stack 122. For example, but not limited to, one or more interrogator antennas 406 might be placed adjacent to the player where the player is likely to be stacking their "out-of-play" gaming chips 200. Thus, the value of gaming chips 200, and other information of interest, may be determined for a particular player by monitoring the gaming chips 200 that are available to the player for future games.

Also, as illustrated in FIG. 4, each of the interrogator antennas 406 was coupled to one transceiver TR. In alternative embodiments, a single transceiver may be coupled to a plurality of interrogator antennas 406.

In some embodiments, communication unit 112 (FIGS. 1, 4, and 6) may be a device that integrates signals to and from the power transmitters TP and the transceivers TS at a gaming table 106. Timing of signals, such as the initiation of an interrogation signal, would be controlled remotely by the processing system 114 or another suitable controller. In other embodiments, the communication unit 112 may include a processor which is integrated with a dealer interface unit or a game interface unit (not shown) such that interrogation signals are initiated as a function of game play at that particular gaming table 106. In yet other embodiments, the communication unit 112 is omitted and the processing system 114 is located at the gaming table 106, or in very close proximity, such that the power transmitter TP and the transceivers TS communicate directly with and/or are controlled directly by the processing system 114.

With respect to FIG. 5, it is appreciated that the location and/or orientation of the first transceiver 502*a*, second transceiver 502*b*, and power conversion element 506 to their respective antenna 504*a*, 504*b*, 508 is not significantly relevant to the communication protocols and/or processes described herein. That is, the first transceiver 502*a*, second transceiver 502*b*, and power conversion element 506 may reside in any suitable location in the RF tag 202. For example, the components may be oriented in a side-to-side manner.

Preferably, the first transceiver 502*a*, second transceiver 502*b*, power conversion element 506, processing system 510, and memory 512 are fabricated together on a common integrated circuit (IC) chip. In other embodiments, one or more of the components may be fabricated separately and communicatively coupled to other components using any suitable means.

The antennas 504*a*, 504*b*, and 508 were illustrated as external to the RF tag 202. For example, one or more of the antennas 504*a*, 504*b*, and 508 could be separately fabricated and attached to the gaming chip 200, such as on a label or the like. Alternatively, one or more of the antennas 504*a*, 504*b*, and 508 could be included as part of the RF tag 202, such as a component of an IC circuit.

In the above-described embodiments, the processing system 510 (FIG. 5) calculated the current value of the stack by adding the value of the current gaming chip to the value of the gaming chips below it in the stack. Alternative embodiments may use other means for calculating the current value of the stack. In one embodiment, a pointer in the memory may be indexed in accordance with the value of the current gaming chip to the value of the gaming chips below it in the stack. For example, a received RF signal may comprise an increment value. The pointer in the memory is incremented by the increment value to a second stack pointer value. Then, the second RF interrogation signal would comprise the second stack pointer value. The stack pointer value would correspond to a chip value associated with the gaming chip body. The second stack value would correspond to a current value of the plurality of stack of gaming chips.

In other embodiments, a state machine or the like may perform the stack value calculations. Or, information from the interrogation signal may be stored directly into the memory 512 by an antenna and/or by an intermediary device (that is not a transceiver). In other embodiments, an equation or other representation may be modified by each gaming chip such that solution of the equation results in a determination of the value of the gaming chips in the stack.

In yet other embodiments, the above-described transceivers 502*a* and/or 502*b* may be implemented as a separate receiver and a separate transmitter. Or, one receiver and one transmitter may be coupled to both of the antennas. A switch means or the like would be operably to switch to the appropriate antenna, or communicate signals with the appropriate antenna, such that the above-described chip-to-chip communication signals are selectively received and transmitted.

In some embodiments, directional antennas may be used for the above-described antennas 406, 504 and/or 704. Directional antennas direct communicated signals in a direction of interest and accordingly. Orienting the direction of communicated signals would reduce the probability of signal collisions between gaming chips of adjacent stacks. For example, if directional antennas 504 in a gaming chip 200 are oriented to radiate communicated signals in a direction perpendicular to the face of a gaming chip 200, the communicated signals would be more directed to the adjacent gaming chip 200 in its stack. Here, the first directional antenna **504*a* would be operable to receive the first RF signal and/or interrogation signal when the signal is aligned in a direction substantially perpendicular to a face of the gaming chip 200, and a second directional antenna 504*b* would be operable to communicate the second RF signal in a direction substantially perpendicular to the opposing face of the gaming chip 200**. Thus, the directional antenna would transmit communication signals where the strength of signal portions radiating out to gaming chips in adjacent stacks would be reduced. All such modifications and variations are intended to be included herein within the scope of this disclosure.

In alternative embodiments, communicated signals may be of any suitable portion of the electromagnetic spectrum. For example, communication signals may be in the microwave or radar ranges of the electromagnetic frequency spectrum. Such signals are also referred to herein as RF signals for brevity and convenience. All such modifications and variations are intended to be included herein within the scope of this disclosure.

In some embodiments, the interrogator antenna 406 and its associated transceiver TR may be used to provide electrical power to the gaming chips 200 of a stack. For example, some aspect of the electromagnetic signal communicated to the gaming chips by the interrogator antenna 406 may be different from an interrogation signal, such as frequency and/or signal strength (amplitude). The antenna 508 could receive the communicated energy and convert it to electrical energy as described above. In yet other embodiments, one or both of the antennas **504*a* and/or 504*b*** could receive the transmitted electromagnetic signal and convert it into electrical power. All such modifications and variations are intended to be included herein within the scope of this disclosure.

Figure 10:
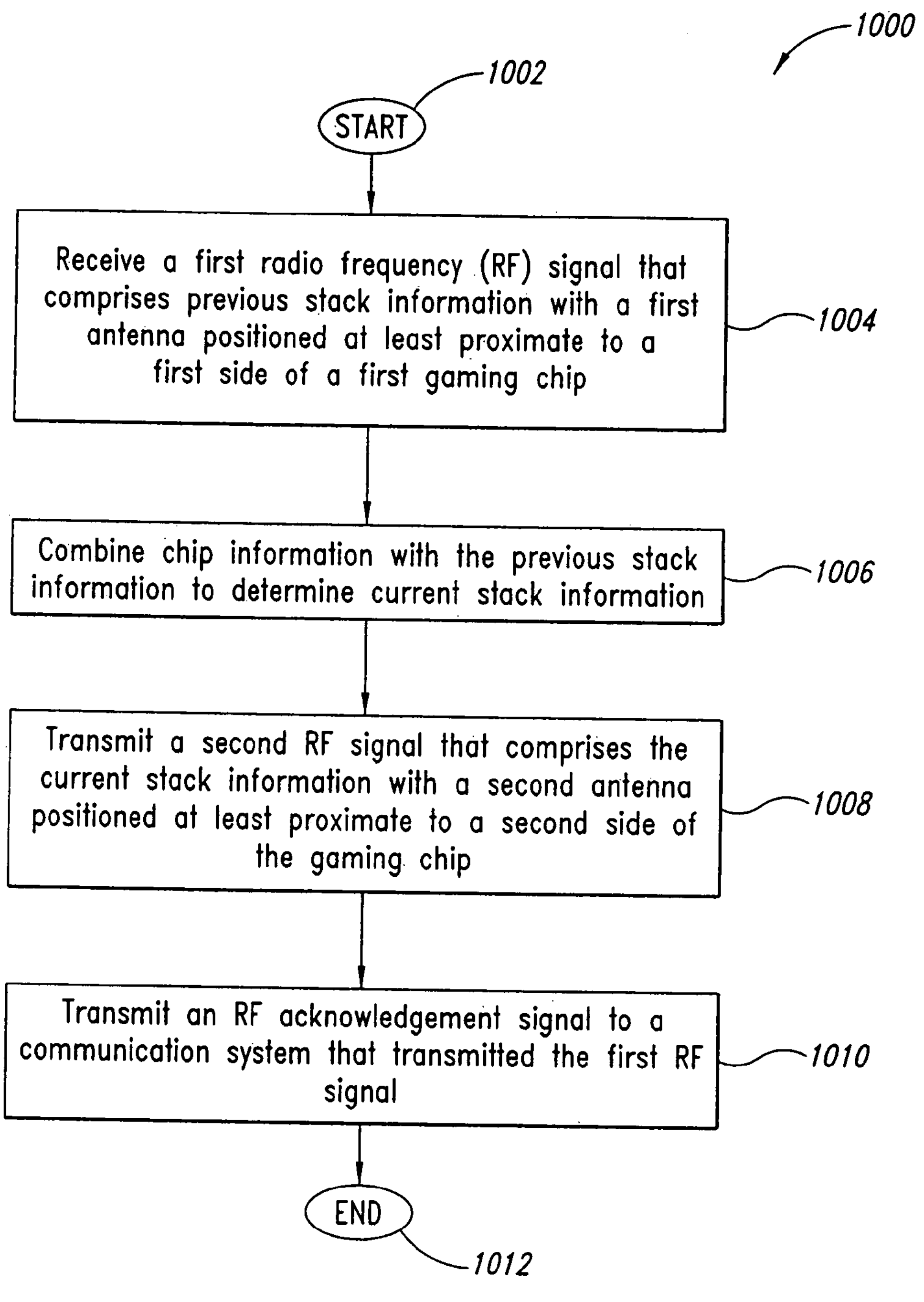
FIGS. 10-11 are flowcharts illustrating various embodiments of a process for communicating information with gaming chips.
Figure 11:
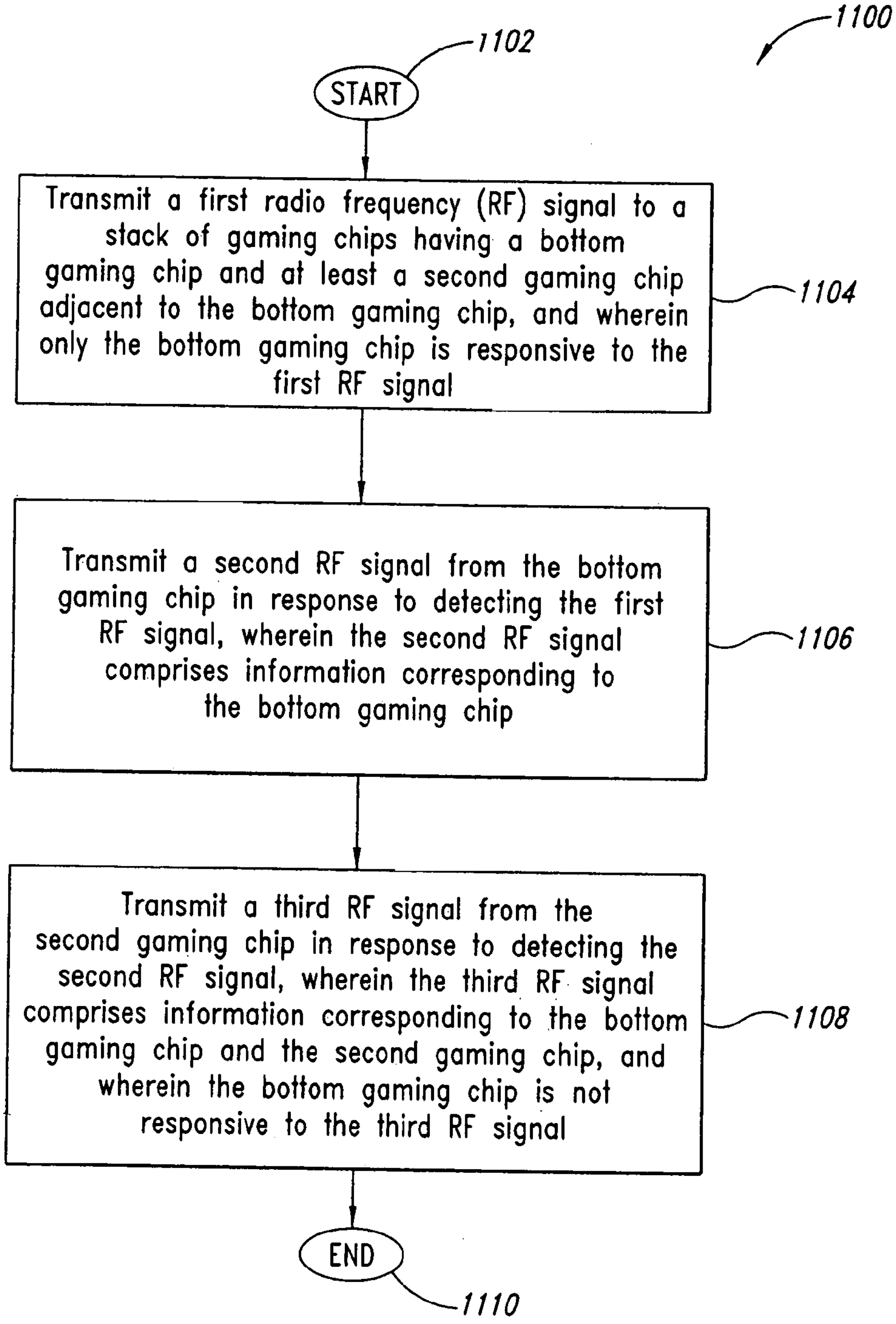
Figure 12A:
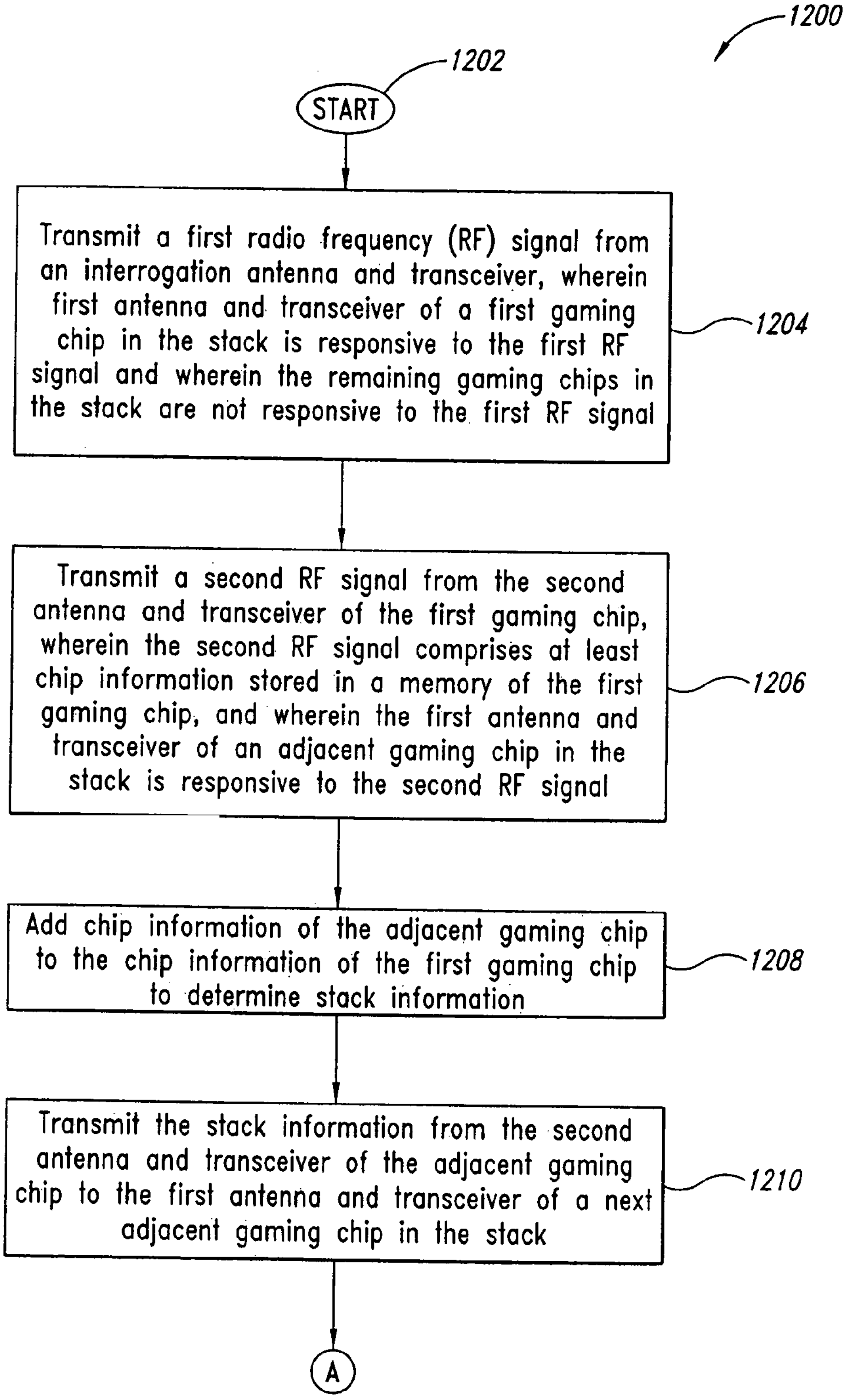
FIGS. 12A-B are flowcharts illustrating an alternative embodiment of a process for communicating information with gaming chips
Figure 12B:
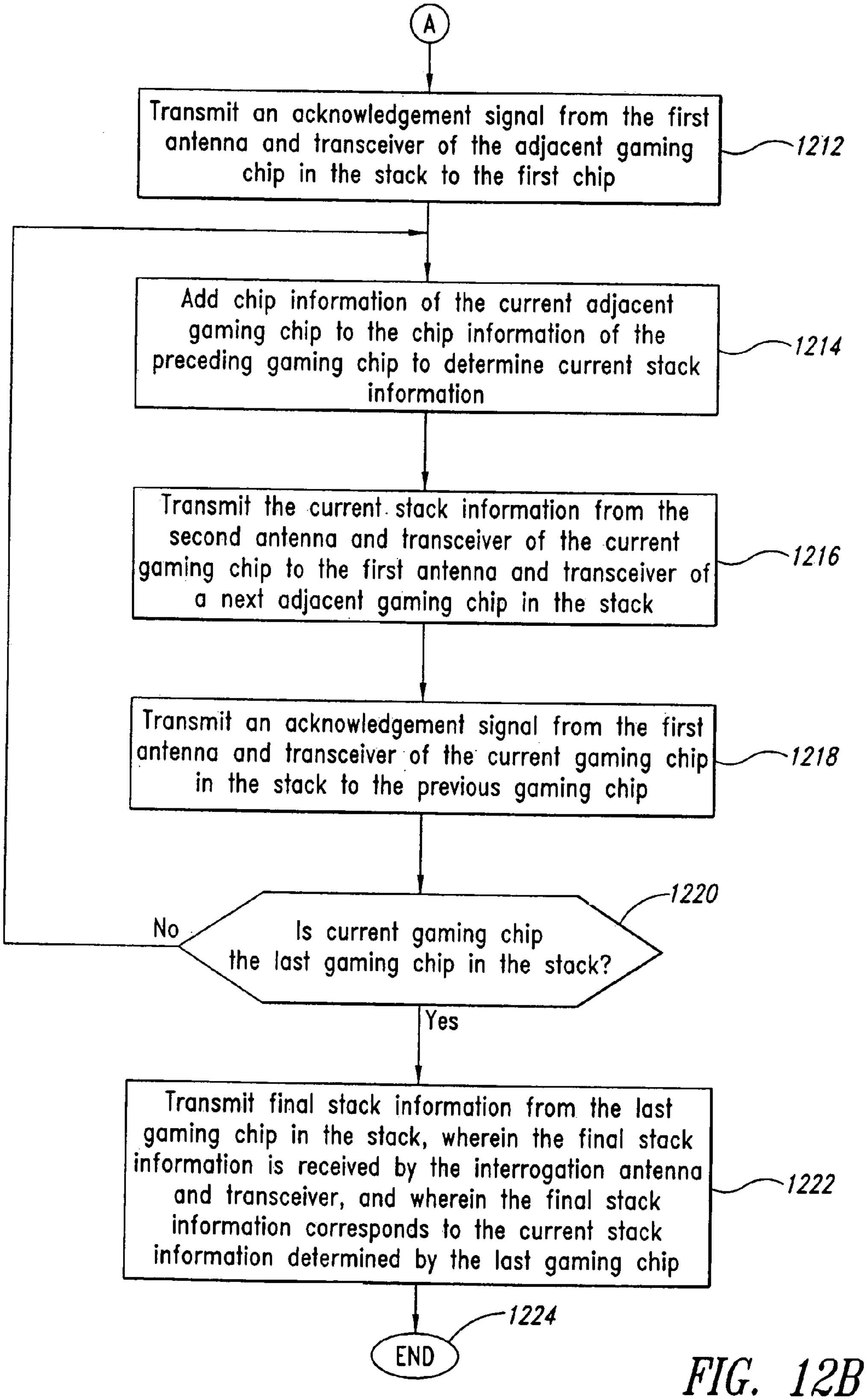

FIGS. 10-12 are flowcharts 1000, 1100, and 1200 illustrating a processes of communicating information with gaming chips. It should be noted that in some alternative implementations, the functions noted in the blocks may occur out of the order noted in FIGS. 10, 11, and/or 12, may include additional functions, and/or may omit some functions. For example, two blocks shown in succession in FIGS. 10, 11, and/or 12 may in fact be executed substantially concurrently, the blocks may sometimes be executed in the reverse order, or some of the blocks may not be executed in all instances, depending upon the functionality involved, as will be further clarified hereinbelow. All such modifications and variations are intended to be included herein within the scope of this disclosure.

The process illustrated in FIG. 10 starts at block 1002. A first RF signal is received that comprises previous stack information with a first antenna positioned at least proximate to a first side of a first gaming chip at block 1004. Chip information is combined with the previous stack information to determine current stack information at block 1006. A second RF signal is transmitted that comprises the current stack information with a second antenna positioned at least proximate to a second side of the gaming chip at block 1008. An RF acknowledgement signal is transmitted to a communication system that transmitted the first RF signal at block 1010. The process ends at block 1012.

The process illustrated in FIG. 11 starts at block 1102. A first RF signal is transmitted to a stack of gaming chips having a bottom gaming chip and at least a second gaming chip adjacent to the bottom gaming chip at block 1104, wherein only the bottom gaming chip is responsive to the first RF signal. A second RF signal is transmitted from the bottom gaming chip in response to detecting the first RF signal, wherein the second RF signal comprises information corresponding to the bottom gaming chip at block 1106. A third RF signal is transmitted from the second gaming chip in response to detecting the second RF signal at block 1108, wherein the third RF signal comprises information corresponding to the bottom gaming chip and the second gaming chip, and wherein the bottom gaming chip is not responsive to the third RF signal. The process ends at block 1110.

The process illustrated in FIG. 12 starts at block 1202. A first RF signal is transmitted from an interrogation antenna and transceiver, wherein the first antenna and transceiver of a first gaming chip in the stack are responsive to the first RF signal and wherein the remaining gaming chips in the stack are not responsive to the first RF signal at block 1204. A second RF signal is transmitted from the second antenna and transceiver of the first gaming chip at block 1206, wherein the second RF signal comprises at least chip information stored in a memory of the first gaming chip, and wherein the first antenna and transceiver of an adjacent gaming chip in the stack is responsive to the second RF signal. Chip information of the adjacent gaming chip is added to the chip information of the first gaming chip to determine stack information at block 1208. The stack information is transmitted from the second antenna and transceiver of the adjacent gaming chip to the first antenna and transceiver of a next adjacent gaming chip in the stack at block 1210. An acknowledgement signal is transmitted from the first antenna and transceiver of the adjacent gaming chip in the stack to the first chip at block 1212.

Blocks 1214, 1216, 1218, and 1220, described below, are repeated for each of the remaining gaming chips in the stack. Chip information of the current adjacent gaming chip is added to the chip information of the preceding gaming chip to determine current stack information at block 1214. The current stack information is transmitted from the second antenna and transceiver of the current gaming chip to the first antenna and transceiver of a next adjacent gaming chip in the stack at block 1216. An acknowledgement signal is transmitted from the first antenna and transceiver of the current gaming chip in the stack to the previous gaming chip at block 1218. A determination is made whether the current gaming chip is the last gaming chip in the stack at block 1220. Upon determination that the current gaming chip is the last gaming chip in the stack, the process proceeds to block 1222. Final stack information is transmitted from the last gaming chip in the stack at block 1222, wherein the final stack information is received by the interrogation antenna and transceiver, and wherein the final stack information corresponds to the current stack information determined by the last gaming chip. The process ends at block 1224.

The preferred embodiment of the gaming chip communication system 100 may be implemented as firmware, software, or other computer-readable medium executed by a digital signal processor. However, the preferred embodiment of the gaming chip communication system 100, and/or alternative embodiments, may be implemented as hardware, or a combination of hardware and firmware. When implemented as hardware, the gaming chip communication system 100 can be constructed of any of the commonly employed technologies as are well known in the art. Any such implementations of the gaming chip communication system 100 are intended to be within the scope of this disclosure.

The various embodiments described above can be combined to provide further embodiments. Aspects of the present systems and methods can be modified, if necessary, to provide yet further embodiments.

These and other changes can be made to the present systems and methods in light of the above-detailed description. In general, in the following claims, the terms used should not be construed to limit the invention to the specific embodiments disclosed in the specification and the claims, but should be construed to include all power systems and methods that read in accordance with the claims. Accordingly, the invention is not limited by the disclosure, but instead its scope is to be determined entirely by the following claims.

The invention claimed is:

1. A radio frequency (RF) gaming chip communication system, comprising:

a first gaming chip;

a processor-readable memory carried by the first gaming chip gaming chip and configured to store chip information and instructions;

a first antenna carried by the first gaming chip, communicatively coupled to the processor-readable memory, that receives a first radio frequency (RF) signal that comprises at least previous stack information from a second gaming chip, wherein the at least previous stack information corresponds to at least a portion of respective chip information of the second gaming chip; and a second antenna carried by the first gaming chip that communicates a second RF signal that comprises current stack chip information; and a processing system having at least one processor carried by the first gaming chip and communicatively coupled to the processor-readable memory and to the first and the second antennas, wherein the instructions, when executed by the at least one processor, cause the at least one processor to:

generate current stack information based at least on a combination of at least a portion of the previous stack information and at least a portion of the chip information, provide the second antenna with the second RF signal, and provide the first antenna with an RF acknowledgement signal in response to receipt by the first antenna of the first RF signal, wherein the first antenna communicates an RF acknowledgement signal to the second gaming chip that transmitted the first RF signal; and wherein the first antenna has a communication range and the second antenna have co-extensive communication ranges.

2. The RF gaming chip communication system of claim 1, further comprising:

a first transceiver carried by the first gaming chip, communicatively coupled to the processor-readable memory and the first antenna, and configured to communicate at least the received previous stack information to the processor-readable memory in response to receiving the first RF signal; and a second transceiver carried by the first gaming chip and communicatively coupled to the processor-readable memory and the second antenna, and configured to communicate the previous stack information and the chip information to the second antenna.

3. The RF gaming chip communication system of claim 2 wherein the second transceiver comprises:

a second receiver; and a second transmitter.

4. The RF gaming chip communication system of claim 1, further comprising:

a transceiver carried by the first gaming chip and communicatively coupled to the processor-readable memory, the first antenna, and the second antenna, and configured to communicate at least the previous stack information received from the first antenna to the processor-readable memory in response to receiving the first RF signal, and configured to communicate the previous stack information and the chip information to the second antenna.

5. The RF gaming chip communication system of claim 1 wherein the first antenna comprises:

a first directional antenna communicatively coupled to the processor-readable memory and configured to receive a first radio frequency (RF) signal that comprises at least previous stack information when aligned in a direction substantially perpendicular to a face of the first gaming chip, and wherein the second antenna comprises:

a second directional antenna configured to communicate a second RF signal that comprises the previous stack information and the chip information in a direction substantially perpendicular to an opposing face of the first gaming chip.

6. The RF gaming chip communication system of claim 1, further comprising:

a gaming chip body that has the processing system enclosed therein; and wherein the processing system is configured to receive the previous stack information and the instructions, when executed by the at least one processor, cause the at least one processor to associate at least chip information for the gaming chip body to with the previous stack information.

7. The RF gaming chip communication system of claim 6, wherein the instructions, when executed by the at least one processor, cause the at least one processor to add a chip value of the gaming chip body to a value of chips in the previous stack information to determine a current stack value.

8. The RF gaming chip communication system of claim 1, further comprising:

a third antenna carried by the first gaming chip and communicatively configured to receive an electromagnetic power signal from a remote power antenna and transmitter; and a power source carried by the first gaming chip and electrically coupled to at least the processing system and the third antenna, configured to convert the received electromagnetic signal into electrical power, and configured to supply the electrical power used by at least one component of the first gaming chip.

9. The RF gaming chip communication system of claim 1, further comprising:

a chip value residing in the processor-readable memory and associated with a value of the gaming chip body, wherein the previous stack information comprises a previous stack value, wherein the instructions, when executed by the at least one processor, cause the at least one processor to add the previous stack value to the chip value to determine a current stack value, and wherein in the second RF signal comprises the current stack value.

10. The RF gaming chip communication system of claim 9 wherein the second gaming chip includes a respective processor-readable memory carried by the second gaming chip that stores a respective chip value associated with a value of the second gaming chip, and wherein the second gaming chip is configured to if determine a respective current stack value equals the respective chip value associated with the second gaming chip and to include the respective current stack value in the previous stack information that is communicated to the first gaming chip via the first radio frequency (RF) signal.

11. The RF gaming chip communication system of claim 9 wherein the previous stack value corresponds to a total monetary value of a plurality of preceding gaming chips, and wherein the chip value corresponds to a monetary value of the gaming chip body.

12. The RF gaming chip communication system of claim 9 wherein the previous stack value corresponds to a previous index value for a plurality of preceding gaming chips, wherein the chip value corresponds to a chip index value of the gaming chip body, wherein the previous index value is incremented by the chip index value to determine a current index value, and wherein in the second RF signal comprises the current index value.

13. The RF gaming chip communication system of claim 1, further comprising:

- an identifier that uniquely identifies the gaming chip body residing in the processor-readable memory,
- wherein the second RF signal further comprises the identifier.

14. The RF gaming chip communication system of claim 13 wherein identifier further comprises:

- metadata corresponding to information of interest.

15. The RF gaming chip communication system of claim 1, further comprising:

- a first stack pointer value stored in the processor-readable memory,
- wherein the second RF signal further comprises an increment value, and wherein a pointer in the processor-readable memory is incremented by the increment value to a second stack pointer value, and wherein the second RF interrogation signal further comprises the second stack pointer value.

16. The RF gaming chip communication system of claim 15 wherein the first stack pointer value corresponds to a chip value associated with the gaming chip body, wherein the increment value corresponds to a total value of a plurality of preceding gaming chips, and wherein the second stack pointer value corresponds to a current value of the plurality of stack of gaming chips.

17. The RF gaming chip communication system of claim 1 wherein the RF acknowledgement signal indicates to the second gaming chip that the first gaming chip has received the first RF signal.

18. The RF gaming chip communication system of claim 1 wherein the second antenna is further configured to receive a second RF acknowledgement signal from an adjacent second gaming chip that indicates that the adjacent second gaming chip has received the second RF signal.

19. The RF gaming chip communication system of claim 18 where, upon failure of the second antenna to receive the second RF acknowledgement signal from the adjacent second gaming chip within a time period, at least the first antenna is further configured to communicate a third RF signal corresponding to a current total value to at least one gaming table receiver.

20. The RF gaming chip communication system of claim 18 wherein, upon a failure of the second antenna to receive the second RF acknowledgement signal from the adjacent second gaming chip within a defined time period, at least the second antenna is further configured to communicate a third RF signal corresponding to the current total value to at least one gaming table receiver.

21. A method for communicating information with at least a first and a second gaming chips, the method comprising:

- receiving a first radio frequency (RF) signal that comprises previous stack information with a first antenna positioned at least proximate to a first side of a first gaming chip and carried by the first gaming chip, wherein the first radio frequency (RF) signal is received from a second gaming chip, and wherein the previous stack information includes chip information of the second gaming chip;
- combining chip information of the first gaming chip with the previous stack information to generate current stack information;
- transmitting a second RF signal that comprises the current stack information with a second antenna positioned at least proximate to a second side of the first gaming chip and carried by the first gaming chip; and
- transmitting a first RF acknowledgement signal to the second gaming chip that transmitted the first RF signal.

22. The method of claim 21 wherein transmitting the RF acknowledgement signal is performed in response to transmitting the second RF signal.

23. The method of claim 21 wherein the second antenna does not respond to the first RF signal.

24. The method of claim 21

- wherein receiving a first radio frequency (RF) signal includes
- receiving the first RF signal with a first transceiver which is responsive to the received first RF signal; and wherein transmitting a second RF signal includes
- transmitting the second RF signal with a second transceiver,
- wherein the second antenna and the second transceiver are not responsive to the first RF signal.

25. The method of claim 21, further comprising:

- adding a chip value associated with the first gaming chip to a previous stack value residing in the previous stack information to determine a current stack value,
- wherein the second RF signal comprises the determined current stack value.

26. The method of claim 25 wherein the previous stack value corresponds to a total monetary value of a plurality of preceding gaming chips, and wherein the chip value corresponds to a monetary value of the first gaming chip.

27. The method of claim 21, further comprising:

- receiving a second RF acknowledgement signal from an adjacent third gaming chip that acknowledges receipt of the transmitted second RF signal.

28. The method of claim 21, further comprising:

- waiting a time period for reception of a second RF acknowledgement signal from an adjacent third gaming chip that acknowledges receipt of the transmitted second RF signal; and
- upon expiration of the time period without receiving the second RF acknowledgement signal, transmitting a third RF signal to at least one gaming table receiver, wherein the third RF signal comprises at least the current stack information.

29. The method of claim 21, further comprising:

- receiving electromagnetic energy;
- converting the received electromagnetic energy into electrical power; and providing the electrical power to at least one component of the gaming chip such that the component has sufficient power for operation.

30. A radio frequency (RF) gaming chip communication system, comprising:

a plurality of gaming chips arranged in a first stack of gaming chips with a first side of each gaming chip adjacent to a second side of another gaming chip, each respective gaming chip of the plurality of gaming chips comprising:

a processor-readable memory carried by the respective gaming chip and configured to store chip information and instructions for communicating stack information to and from at least other respective gaming chips of the plurality of gaming chips;

a first antenna and a first transceiver communicatively coupled together and positioned in proximity to the first side of the respective gaming chip carried by the respective gaming chip and communicatively coupled to the processor-readable memory, configured to respond to a first radio frequency (RF) signal communicated by an adjacent gaming chip in the first stack, wherein the first RF signal comprises previous stack information, and wherein the first antenna and the first transceiver are further configured to communicate the previous stack information to the processor-readable memory; and a second antenna and a second transceiver communicatively coupled together and positioned in proximity to the second side of the respective gaming chip carried by the respective gaming chip and communicatively coupled to the processor-readable memory, and configured to transmit a second RF signal comprising current stack information, wherein the current stack information corresponds to the previous stack information and the chip information of the respective gaming chip, and at least one processor positioned between the first side and the second side of the respective gaming chip and communicatively coupled to the processor-readable memory, wherein the instructions, when executed by the at least one processor, cause the at least one processor to:

receive at least a portion of the first radio frequency (RF) signal, generate the current stack information based at least on the previous stack information and the chip information of the respective gaming chip, and provide at least the current stack information to the second antenna; and an interrogator antenna and an interrogator transceiver configured to initially communicate an interrogation RF signal to the plurality of gaming chips that are arranged in the first stack, wherein one respective gaming chip in the first stack that is closest to the interrogator antenna and the interrogator transceiver is responsive to the interrogation RF signal, and wherein other gaming chips of the first stack are not responsive to the interrogation RF signal.

31. The RF gaming chip communication system of claim 30 wherein the interrogation RF signal antenna has no previous stack information, and wherein for each respective gaming chip of the plurality of gaming chips, the respective instructions, when executed by the at least one processor, cause the at least one processor to generate the respective current stack information based on the respective chip information of the respective gaming chip, and to provide the respective current stack information to the respective second transponder of the respective gaming chip.

32. The RF gaming chip communication system of claim 31 wherein each of a plurality of next adjacent gaming chips sequentially receive the respective second RF signal from the preceding adjacent gaming chip, wherein the chip information of the receiving gaming chip is combined with the previous stack information received from the previous gaming chip to determine the current stack information.

33. The RF gaming chip communication system of claim 30 wherein for each respective gaming chip of the plurality of gaming chips, the respective instructions, when executed by the respective at least one processor, cause the respective at least one processor to, generate an RF acknowledgement signal in response to the second antenna and the second transceiver of the respective gaming chip in the first stack communicating the second RF signal, wherein respective the first antenna and the respective first transceiver of the respective gaming chip are further configured to communicate the RF acknowledgement signal to a different gaming chip in the first stack that communicated the first RF signal received by the respective gaming chip.

34. The RF gaming chip communication system of claim 30 wherein the first stack includes a last gaming chip and wherein the last gaming chip in the first stack, in response to not receiving an RF acknowledgement signal, transmits final stack information to at least the interrogator antenna.

35. The RF gaming chip communication system of claim 30 wherein a last gaming chip in the first stack, in response to not receiving an RF acknowledgement signal, transmits final stack information to at least a receiving antenna of a gaming table.

36. The RF gaming chip communication system of claim 30, wherein final stack information corresponds to a total monetary value of the gaming chips in the first stack, wherein the total monetary value is equal to a sum of the individual monetary values of each of the gaming chips in the first stack.

37. The RF gaming chip communication system of claim 30, further comprising:

a central processing system communicatively coupled to a plurality of the interrogator antenna and the interrogator transceivers, wherein the central processing system receives a respective final stack information from the first stack and from at least a second stack of gaming chips.

38. The RF gaming chip communication system of claim 37 wherein the central processing system determines a total monetary value of the gaming chips in the first and the second stacks of gaming chips.

39. The RF gaming chip communication system of claim 37, further comprising:

a display communicatively coupled to the central processing system that is configured to display at least a total value of the gaming chips in each of the first and the second stacks of gaming chips.

40. The RF gaming chip communication system of claim 37 wherein the first and the second stacks of gaming chips reside in a first betting area such that each of the gaming chips in the first and the second stacks farthest from the interrogator antenna communicate their respective final stack values to the interrogator antenna and the interrogator transceiver so that the central processing system determines a total value of the gaming chips in the first betting area by summing the respective final stack values of each of the first and the second stacks of gaming chips.

41. The RF gaming chip communication system of claim 40 wherein the total value of the gaming chips for a betting table is determined by summing the total values of the gaming chips from all of a plurality of the betting areas on the betting table.

42. The RF gaming chip communication system of claim 30, wherein each respective gaming chip includes a respective identifier stored in the processor-readable memory of the respective gaming chip that uniquely identifies the respective gaming chip, and wherein at least one respective identifier is included in the current stack information.

43. The RF gaming chip communication system of claim 42 wherein the second RF signal transmitted by each gaming chip includes the respective identifier of a current respective gaming chip such that a final chip information transmitted by a last gaming chip in the stack includes the identifiers of each of the gaming chips in the stack.

44. The RF gaming chip communication system of claim 30, further comprising:

a gaming chip tray;

a plurality of gaming chip stack-trays residing on the gaming chip tray; and a plurality of tray interrogator antenna and tray interrogator transceivers, one tray interrogator antenna and tray interrogator transceiver in each one of the plurality of gaming chip stack-trays, wherein each of the tray interrogator antenna and tray interrogator transceivers is configured to initially transmit the interrogation RF signal to the plurality of gaming chips that are arranged in the stack and reside in the respective gaming chip stack-tray, and wherein the gaming chip in the stack closest to the tray interrogator antenna is responsive to the interrogation RF signal, and wherein the remaining gaming chips in the stack are not responsive to the interrogation RF signal.

45. A method for communicating information with gaming chips, the method comprising:

transmitting a first radio frequency (RF) signal to a stack of gaming chips having a bottom gaming chip and at least a second gaming chip adjacent to the bottom gaming chip, and wherein the bottom gaming chip is responsive to the first RF signal and the second gaming chip is not responsive to the first RF signal;

including at least a portion of chip information of the bottom gaming chip in stack information carried in a second RF signal;

transmitting the second RF signal from the bottom gaming chip to the second gaming chip after the bottom gaming chip is responsive to the first RF signal;

combining at least a portion of chip information of the second gaming chip with the portion of chip information of the bottom gaming chip;

including at least a portion of the combined chip information of the bottom gaming chip and the second gaming chip in stack information carried in a third RF signal; and transmitting the third RF signal from the second gaming chip in response to the second RF signal, and wherein the bottom gaming chip is not responsive to the third RF signal.

46. The method of claim 45 wherein combining at least a portion of chip information of the second gaming chip with the portion of chip information of the bottom gaming chip includes determining, at the second gaming chip, a current value of the stack of gaming chips.

47. The method of claim 45, further comprising:

transmitting an RF acknowledgement signal from the second gaming chip in response to transmitting the third RF signal; and receiving the RF acknowledgement signal by the bottom gaming chip, wherein the bottom gaming chip is not responsive to a subsequent RF signal.

48. The method of claim 45, further comprising:

transmitting a first RF acknowledgement signal from the second gaming chip in response to transmitting the third RF signal; timing a period of time; and communicating a final RF signal comprising the combined chip information of the bottom gaming chip and the second gaming chip in response to the second gaming chip not receiving a second RF acknowledgement signal from another adjacent gaming chip within the period of time.

49. A method for determining a total value of a plurality of gaming chips in a stack having a bottom and a top, each gaming chip comprising at least a first antenna and a second antenna, the method comprising:

communicating a first radio frequency (RF) signal from an interrogation antenna, wherein the first antenna of a first gaming chip at the bottom of the stack is responsive to the first RF signal and wherein the remaining gaming chips in the stack are not responsive to the first RF signal;

communicating a second RF signal from the second antenna of the first gaming chip, wherein the second RF signal comprises at least chip information stored in a processor-readable memory of the first gaming chip, and wherein the first antenna of an adjacent gaming chip in the stack is responsive to the second RF signal;

adding chip information of the adjacent gaming chip to the chip information of the first gaming chip carried by the second RF signal to determine stack information;

communicating the stack information from the second antenna of the adjacent gaming chip to the first antenna of a next adjacent gaming chip in the stack;

communicating an acknowledgement signal from the first antenna of the adjacent gaming chip in the stack to the first gaming chip;

sequentially repeating from a current respective gaming chip in the stack to a next to the top of the stack gaming chip, adding chip information of the current respective gaming chip to the chip information of preceding gaming chips to determine current stack information;

communicating the current stack information from the second antenna of the current respective gaming chip to the first antenna of the next adjacent gaming chip in the stack; and communicating the acknowledgement signal from the first antenna of the current respective gaming chip in the stack to a preceding gaming chip; and communicating final stack information from a topmost gaming chip at the top of the stack, wherein the final stack information, and wherein the final stack information corresponds to the current stack information determined by the top most gaming chip.

50. The method of claim 49 wherein communicating the final stack information comprised communicating final stack information to the interrogation antenna.

51. The method of claim 49 wherein communicating the final stack information comprised communicating final stack information to a table antenna.

52. The method of claim 49 wherein transmitting the final stack information from the topmost gaming chip in the stack occurs in response to the topmost gaming chip in the stack not receiving the acknowledgement signal.

53. The method of claim 49 wherein the chip information of a respective gaming chip corresponds to a monetary value associated with the respective gaming chip, wherein the current stack information corresponds to the monetary value of the current gaming chip added to the monetary value of preceding gaming chips, and wherein the final stack information transmitted by the last gaming chip corresponds to a total monetary value for the stack of gaming chips.

54. The method of claim 53, further comprising:

communicating the final stack information transmitted by the top most gaming chip to a central processing system; and associating the final stack information with a total value for the stack of gaming chips.

55. The method of claim 54, further comprising:

communicating a second final stack information transmitted by a second topmost gaming chip in a second stack of gaming chips to the central processing system, wherein the first and second stacks of gaming chips reside in a common betting area; and associating the first final stack information and the second final stack information with the total value for the gaming chips residing in the common betting area.

56. The method of claim 49 wherein the chip information of a respective gaming chip corresponds to a respective identifier associated with the respective gaming chip, wherein the current stack information corresponds to the respective identifier of the current gaming chip combined to the respective identifiers of preceding gaming chips, and wherein the final stack information transmitted by the topmost gaming chip corresponds to all of the identifiers of the stack of gaming chips.

57. The RF gaming chip communication system of claim 1, further comprising:

a transceiver carried by the gaming chip and communicatively coupled to the processor-readable memory, the first antenna and the second antenna, and configured to communicate at least the received previous stack information to the processor-readable memory in response to receiving the first RF signal and to communicate the previous stack information and the chip information to the second antenna.

* * * * *